(12) United States Patent
Rugeland et al.

(10) Patent No.: US 12,156,067 B2
(45) Date of Patent: Nov. 26, 2024

(54) VALIDITY AREA FOR EARLY MEASUREMENT

(71) Applicant: Telefonaktiebolaget LM Ericsson (PUBL), Stockholm (SE)

(72) Inventors: Patrik Rugeland, Bromma (SE); Oumer Teyeb, Montréal (CA); Jens Bergqvist, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 380 days.

(21) Appl. No.: 17/775,074

(22) PCT Filed: Nov. 6, 2020

(86) PCT No.: PCT/IB2020/060481
§ 371 (c)(1),
(2) Date: May 6, 2022

(87) PCT Pub. No.: WO2021/090269
PCT Pub. Date: May 14, 2021

(65) Prior Publication Data
US 2022/0408295 A1  Dec. 22, 2022

Related U.S. Application Data

(60) Provisional application No. 62/932,275, filed on Nov. 7, 2019.

(51) Int. Cl.
*H04W 4/00* (2018.01)
*H04W 24/10* (2009.01)
(52) U.S. Cl.
CPC .................. *H04W 24/10* (2013.01)
(58) Field of Classification Search
CPC .................................................. H04W 24/10
(Continued)

(56) References Cited

U.S. PATENT DOCUMENTS 11,895,720 B2 * 2/2024 Virtej ................ H04W 74/0833
2007/0097939 A1 * 5/2007 Nylander .............. H04W 68/00
455/525
(Continued)

FOREIGN PATENT DOCUMENTS

GB          2497902 A     6/2013

OTHER PUBLICATIONS

3GPP TS 36.331 v15.7.0; Technical Specification; 3rd Generation Partnership Project; Technical Specification Group Radio Access Network; Evolved Universal Terrestrial Radio Access (E-UTRA); Radio Resource Control (RRC); Protocol specification (Release 15)—Sep. 2019.
(Continued)

*Primary Examiner* — Amancio Gonzalez
(74) *Attorney, Agent, or Firm* — Baker Botts L.L.P.

(57) ABSTRACT

According to some embodiments, a method performed by a wireless device for performing early measurement comprises receiving an early measurement configuration for performing idle/inactive mode measurements. The early measurement configuration comprising a measurement carrier list. Each entry of the measurement carrier list comprises a carrier frequency and one or more cell identifiers associated with the carrier frequency for which the wireless device is to perform idle/inactive mode measurements. The early measurement configuration further comprises a validity area list, separate from the measurement carrier list. Each entry of the validity area list comprises a carrier frequency and zero or more cell identifiers associated with the carrier frequency for which the wireless device is supposed to perform idle/inactive mode measurements. The method further comprises reselecting to a new cell and determining whether to perform idle/inactive mode measurements while camping on the new cell based on the validity area list.

22 Claims, 14 Drawing Sheets

(58) Field of Classification Search
USPC .................................................. 455/422.1
See application file for complete search history.

(56) References Cited

U.S. PATENT DOCUMENTS

| | | |
|---|---|---|
| 2016/0242055 A1 | 8/2016 | Kim et al. |
| 2019/0037425 A1 | 1/2019 | Hong et al. |
| 2022/0022081 A1* | 1/2022 | Bao ..................... H04W 76/10 |
| 2022/0131584 A1* | 4/2022 | Dalsgaard ............ H04B 7/0626 |
| 2022/0151000 A1* | 5/2022 | Virtej .................... H04W 24/10 |
| 2022/0248277 A1* | 8/2022 | Cheng ............... H04W 36/0058 |
| 2022/0248349 A1* | 8/2022 | Cheng ................. H04W 56/001 |

OTHER PUBLICATIONS

PCT Notification of Transmittal of the International Search Report and the Written Opinion of the International Searching Authority, or the Declaration issued for International application No. PCT/IB2020/060481—Jan. 29, 2021.

\* cited by examiner

VALIDITY AREA FOR EARLY MEASUREMENT

PRIORITY

This nonprovisional application is a U.S. National Stage Filing under 35 U.S.C. § 371 of International Patent Application Serial No. PCT/IB2020/060481 filed Nov. 6, 2020 and entitled "VALIDITY AREA FOR EARLY MEASUREMENT" which claims priority to U.S. Provisional Patent Application No. 62/932,275 filed Nov. 7, 2019 both of which are hereby incorporated by reference in their entirety.

TECHNICAL FIELD

Embodiments of the present disclosure are directed to wireless communications and, more particularly, to a validity area for performing early measurement in inactive/idle mode.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Third Generation Partnership Project (3GPP) long term evolutions (LTE) includes carrier aggregation (CA) that enables a user equipment (UE) to transmit/receive information via multiple cells (referred to as secondary cells or SCell(s)) from multiple carrier frequencies to benefit from the existing non-contiguous and contiguous carriers. In CA terminology, the PCell is the cell towards which the UE established the radio resource control (RRC) connection or did handover to. In CA, cells are aggregated on the medium access control (MAC)-level. The MAC gets grants for a certain cell and multiplexes data from different bearers to one transport block being sent on that cell. The MAC controls the process. An example is illustrated in FIG. 1.

FIG. 1 is a block diagram illustrating an example of carrier aggregation. In the illustrated example, the MAC layer multiplexes multiple bearers from the packet data convergence protocol (PDCP) and radio link control (RLC) layers for Cell1, Cell2, and Cell3.

SCells can be added (or configured) for the UE using RRC signaling (e.g., RRCConnectionReconfiguration), which takes on the order of 100 s of milliseconds. A cell that is configured for the UE becomes a serving cell for the UE. An SCell may also be associated to an SCell state. When configured/added via RRC, an SCell starts in deactivated state. The eNB can indicate to activate-upon-configuration, or change the state, at least in RRCReconfiguration, as described below.

```
1>for each SCell configured for the UE other than the PSCell:
  2>if the received RRCConnectionReconfiguration message
     includes sCellState for the
     SCell and indicates activated:
     3>configure lower layers to consider the
       SCell to be in activated state;
  2>else if the received RRCConnectionReconfiguration message
     includes sCellState for
     the SCell and indicates dormant:
     3>configure lower layers to consider the
       SCell to be in dormant state;
  2>else:
     3>configure lower layers to consider the SCell
       to be in deactivated state;
```

An intermediate state between the deactivated and active state is used for enhanced uplink operation. A MAC Control Element (MAC CE) can be used to change the SCell state between the three states as illustrated below in FIG. 2. There are also timers in MAC to move a cell between deactivated/activated/dormant. The timers are: (a) sCellHibernationTimer, which moves the SCell from activated state to dormant state; (b) sCellDeactivationTimer, which moves the SCell from activated state to deactivated state; and (c) dormantSCellDeactivationTimer, which moves the SCell from dormant state to deactivated state. The MAC level SCell activation takes in the order of 20-30 ms.

After the network understands the need to configure and/or activate CA, the question is which cells to initially configure and/or activate, if they are configured, and/or whether a cell/carrier is good enough in terms of radio quality/coverage (e.g., reference signal received power (RSRP) and reference signal received quality (RSRQ)). To understand the conditions on SCell(s) or potential SCell(s) in a given available carrier the network may configure the UE to perform radio resource management (RRM) measurements.

Typically, the network may be assisted by RRM measurements to be reported by a UE. The network may configure the UE with measurement IDs associated to reportConfig with event A1 (serving becomes better than threshold) in case this is a configured SCell, or A4 (neighbor becomes better than threshold) for carriers without a configured SCell. The measurement objects are associated to the carrier the network wants reports on. If the network is aware of the exact cells it wants the UE to measure, a white cell list can be configured in the measurement object so that the UE is only required to measure the listed cells in that carrier. An example is illustrated in FIG. 3.

FIG. 3 is a flow diagram illustrating carrier aggregation and/or dual connectivity 9 DC) setup. The UE connects to the master node and the master node determines to setup CA/DC. To determine appropriate SCell(s), the master node configures the UE to report measurements. Based on the reported measurements (which can take a significant amount of time), the master node determines which SCell(s) to add.

With dual connectivity, it is possible to add what is referred to as a SCG (Secondary Cell Group) configuration to the UE. The main benefit is that the UE can in principle add a cell from another eNodeB. Protocol-wise, that requires different MAC entities, one for each cell group. The UE has two cell groups, one associated to the PCell (master node) and another associated to a PScell (of the secondary eNodeB), where each group may possibly have their own associated SCells.

When it comes to adding SCells, when the UE is in single connectivity, for example, the RRCConnectionReconfiguration message may carry a cell index (so MAC identifiers are optimized, i.e., shorter), cell identifier and carrier frequency, common parameters, and state information, (activated or dormant).

```
SCellToAddModList-r10 ::= SEQUENCE (SIZE (1..maxSCell-r10) ) OF
SCellToAddMod-r10
SCellToAddMod-r10 ::=              SEQUENCE {
  sCellIndex-r10                     SCellIndex-r10,
  cellIdentification-r10             SEQUENCE {
    physCellId-r10                     PhysCellId,
    dl-CarrierFreq-r10                 ARFCN-ValueEUTRA
  }                                        OPTIONAL, -- Cond
SCellAdd
  radioResourceConfigCommonSCell-r10   RadioResourceConfigCommonSCell-
r10 OPTIONAL, -- Cond SCellAdd
  radioResourceConfigDedicatedSCell-r10
  RadioResourceConfigDedicatedSCell-r10  OPTIONAL, -- Cond SCellAdd2
  ...,
  [ [ dl-CarrierFrew-v1090           ARFCN-ValueEUTRA-v9e0 OPTIONAL --
Cond EARFCN-max
  ] ],
  [ [ antennaInfoDedicatedSCell-v10i0   AntennaInfoDedicated-v10i0
OPTIONAL -- Need ON
  ] ],
  [ [ srs-SwitchFromServCellIndex-r14  INTEGER (0.. 31) OPTIONAL -- Need
ON
  ] ],
  [ [ sCellState-r15                 ENUMERATED {activated, dormant}
OPTIONAL -- Need ON
  ] ]
}
```

| RRCConnectionReconfiguration field descriptions |
|---|
| sCellConfigCommon |
| Indicates the common configuration for the SCell group. |
| sCellGroupIndex |
| Indicates the identity of SCell groups for which a common configuration is provided. |
| sCellIndex |
| In case of DC, the SCellIndex is unique within the scope of the UE i.e. an SCG cell cannot use the same value as used for an MCG cell. For pSCellToAddMod, if sCellIndex-r13 is present the UE shall ignore sCellIndex-r12. sCellIndex-r13 in sCellToAddModListExt-r13 shall not have same values as sCellIndex-r10 in sCellToAddModList-r10. |
| sCellGroupToAddModList, sCellGroupToAddModListSCG |
| Indicates the SCell group to be added or modified. E-UTRAN only configures at most 4 SCell groups per UE over all cell groups. |
| sCellGroupToReleaseList |
| Indicates the SCell group to be released. |
| sCell State |
| A one-shot field that indicates whether the SCell shall be considered to be in activated or dormant state upon SCell configuration. |

| RRCConnectionReconfiguration field descriptions |
|---|
| sCellToAddModList, sCellToAddModListExt |
| Indicates the SCell to be added or modified. Field sCellToAddModList is used to add the first 4 SCells for a UE with sCellIndex-r10 while sCellToAddModListExt is used to add the rest. If E-UTRAN includes sCellToAddModListExt-v1430 it includes the same number of entries, and listed in the same order, as in sCellToAddModListExt-r13. If E-UTRAN includes sCellToAddModList-v10l0 it includes the same number of entries, and listed in the same order, as in sCellToAddModList-r10. If E-UTRAN includess CellToAddModListExt-v1370 it includes the same number of entries, and listed in the same order, as in sCellToAddModListExt-r13. If E-UTRAN includes sCellToAddModListExt-v13c0 it includes the same number of entries, and listed in the same order, as in sCellToAddModListExt-r13. |
| sCellToAddModListSCG, sCellToAddModListSCG-Ext |
| Indicates the SCG cell to be added or modified. The field is used for SCG cells other than the PSCell (which is added/modified by field pSCellToAddMod). Field sCellToAddModListSCG is used to add the first 4 SCells for a UE with sCellIndex-r10 while sCellToAddModListSCG-Ext is used to add the rest. If E-UTRAN includes sCellToAddModListSCG-v10l0 it includes the same number of entries, and listed in the same order, as in sCellToAddModListSCG-r12. If E-UTRAN includes sCellToAddModListSCG-Ext-v1370 it includes the same number of entries, and listed in the same order, as in sCellToAddModListSCG-Ext-r13. If E-UTRAN includes sCellToAddModListSCG-Ext-v13c0 it includes the same number of entries, and listed in the same order, as in sCellToAddModListSCG-Ext-r13. |
| sCellToReleaseListSCG, sCellToReleaseListSCG-Ext |
| Indicates the SCG cell to be released. The field is also used to release the PSCell e.g. upon change of PSCell, upon system information change for the PSCell. |

The procedure to add SCells to the MCG in LTE (or to modify) is described as follows (as in TS 36.331).

If the RRCConnectionReconfiguration message does not include the mobilityControlInfo and the UE is able to comply with the configuration included in this message, the UE shall:
. . .
1>if the received RRCConnectionReconfiguration includes the sCellToAddModList:
2>perform SCell addition or modification as specified in 5.3.10.3b;
. . .
For SCell addition or modification, the UE shall:

-continued

1>for each sCellIndex value included either in the sCellToAddModList or in the sCellToAddModListSCG that is not part of the current UE configuration (SCell addition):
  2>add the SCell, corresponding to the cellIdentification, in accordance with the radioResourceConfigCommonSCell and radioResourceConfigDedicatedSCell, both included either in the sCellToAddModList or in the sCellToAddModListSCG;
  2>if sCellState is configured for the SCell and indicates activated;
    3>configure lower layers to consider the SCell to be in activated state;
  2>else if sCellState is configured for the SCell and indicates dormant
    3>configure lower layers to consider the SCell to be in dormant state;
  2>else:
    3>configure lower layers to consider the SCell to be in deactivated state;
  2>for each measId included in the measIdList within VarMeasConfig;
    3>if SCells are not applicable for the associated measurement; and
    3>if the concerned SCell is included in cellsTriggeredList defined within the VarMeasReportList for this measId;
      4>remove the concerned SCell from cellsTriggeredList defined within the VarMeasReportList for this measId;
1>for each sCellIndex value included either in the sCellToAddModList or in the sCellToAddModListSCG that is part of the current UE configuration (SCell modification):
  2>modify the SCell configuration in accordance with the radioResourceConfigDedicatedSCell, included either in the sCellToAddModList or in the sCellToAddModListSCG;

Some implementations include early measurements upon idle/inactive to connected transition in LTE. It is possible to configure the UE to report early measurements upon the transition from idle/inactive to connected state. These measurements are measurements that the UE can perform in idle/inactive state, and according to a configuration provided by the source cell with the intention to receive these measurements immediately after the UE is connected and quickly setup CA and/or other forms of DC (e.g., EN-DC, MR-DC, etc.) without the need to first provide a measurement configuration (measConfig) in RRC_CONNECTED, and wait for hundreds of milliseconds until first samples are collected, monitored and then the first reports are triggered and transmitted to the network.

A first aspect of the existing solution, as standardized in EUTRA 36.331 (v15.7.0), is described in 5.6.20 Idle Mode Measurements. The UE can receive the idle/inactive mode measurement configurations in the system information (SIBS) in the field MeasIdleConfigSIB-r15, indicating up to 8 cells or ranges of cell IDs to perform measurements on. In addition, the UE can be either configured upon the transition from RRC_CONNECTED to RRC_IDLE with a dedicated measurement configuration in the RRCConnectionRelease message with the measIdleDedicated-r15 which overrides the broadcasted configurations in SIBS. The broadcasted and dedicated signaling is shown below:

```
                   RRCConnectionRelease message

-- ASN1START
RRCConnectionRelease ::=         SEQUENCE {
   rrc-TransactionIdentifier     RRC-TransactionIdentifier,
   criticalExtensions            CHOICE {
      c1                         CHOICE {
         rrcConnectionRelease-r8    RRCConnectionRelease-r8-IEs,
         spare3 NULL, spare2 NULL, spare1 NULL
      },
      criticalExtensionsFuture   SEQUENCE { }
   }
}
-- other info has been omitted
RRCConnectionRelease-v1530-IEs ::= SEQUENCE {
   drb-ContinueROHC-r15          ENUMERATED {true}   OPTIONAL,
-- Cond UP-EDT
   nextHopChainingCount-r15      NextHopChainingCount
```

-continued

```
                   RRCConnectionRelease message

OPTIONAL, -- Cond UP-EDT
   measIdleConfig-r15            MeasIdleConfigDedicated-r15
                                                     OPTIONAL, -- Need ON
   rrc-InactiveConfig-r15        RRC-InactiveConfig-r15
                                                     OPTIONAL, -- Need OR
   cn-Type-r15                   ENUMERATED {epc,fivegc}
                                                     OPTIONAL, -- Need OR
   nonCriticalExtension          SEQUENCE { }        OPTIONAL
}
-- ASN1STOP
```

```
                   MeasIdleConfig information element

-- ASN1START
MeasIdleConfigSIB-r15 ::= SEQUENCE {
   measIdleCarrierListEUTRA-r15 EUTRA-CarrierList-r15,
   ...
}
MeasIdleConfigDedicated-r15 ::= SEQUENCE {
   measIdleCarrierListEUTRA-r15 EUTRA-CarrierList-r15   OPTIONAL,
- Need OR
   measIdleDuration-r15   ENUMERATED {sec10, sec30, sec60, sec120,
                                      sec180, sec240, sec300, spare},
   ...
}
EUTRA-CarrierList-r15 ::= SEQUENCE (SIZE (1..maxFreqIdle-r15)) OF
MeasIdleCarrierEUTRA-r15
MeasIdleCarrierEUTRA-r15::= SEQUENCE {
   carrierFreq-r15         ARFCN-ValueEUTRA-r9,
   allowedMeasBandwidth-r15 AllowedMeasBandwidth,
   validityArea-r15        CellList-r15           OPTIONAL, --
Need OR
   measCellList-r15        CellList-r15           OPTIONAL, --
Need OR
   reportQuantities        ENUMERATED {rsrp, rsrq, both},
   qualityThreshold-r15    SEQUENCE {
      idleRSRP-Threshold-r15   RSRP-Range          OPTIONAL, -
- Need OR
      idleRSRQ-Threshold-r15   RSRQ-Range-r13      OPTIONAL -
- Need OR
   }                                               OPTIONAL, --
Need OR
   ...
}
```

| MeasIdleConfig information element | |
|---|---|
| CellList-r15 ::=<br>PhysCellIdRange<br>-- ASNISTOP | SEQUENCE (SIZE (1.. maxCellMeasIdle-r15)) OF |

| MeasIdleConfig field descriptions |
|---|
| allowedMeasBandwidth |
| If absent, the value corresponding to the downlink bandwidth indicated by the dl-Bandwidth included in MasterInformationBlock of serving cell applies. |
| carrierFreq |
| Indicates the E-UTRA carrier frequency to be used for measurements during IDLE mode. |
| measIdleCarrierListEUTRA |
| Indicates the E-UTRA carriers to be measured during IDLE mode. |

| MeasIdleConfig field descriptions |
|---|
| measIdleDuration| |
| Indicates the duration for performing measurements during IDLE mode for measurements assigned via RRCConnectionRelease. Value sec10 correspond to 10 seconds, value sec30 to 30 seconds and so on. |
| qualityThreshold |
| Indicates the quality thresholds for reporting the measured cells for IDLE mode measurements. |
| reportQuantities |
| Indicates which measurement quantities UE is requested to report in the IDLE mode measurement report. |
| measCellList |
| Indicates the list of cells which the UE is requested to measure and report for IDLE mode measurements. |
| validityArea |
| Indicates the list of cells within which UE is requested to do IDLE mode measurements. If the UE reselects to a |

| MeasIdleConfig field descriptions |
|---|
| cell outside this list, the measurements are no longer required. |

Some implementations include carrier information and a cell list. The UE is provided with a list of carriers and optionally with a list of cells that the UE shall perform measurements. The fields s-NonIntraSearch in SystemInformationBlockType3 do not affect the UE measurement procedures in IDLE mode.

Upon the reception of the measurement configuration, the UE starts a timer T331 with the value provided in measIdleDuration, which can go from 0 to 300 seconds. The timer stops upon receiving RRCConnectionSetup, RRCConnectionResume which indicates a transition to RRC_CONNECTED. The purpose is to limit the amount of time the UE performs early measurements.

A validity area comprises a list of physical cell identities (PCIs) that is signalled per carrier that the UE shall perform idle mode measurements on. The intention is to limit the area where CA or DC may be setup later when the UE resumes/setups the connection, so the early measurements are somewhat useful for that purpose. If a validityArea is configured, and UE reselects to a serving cell whose PCI does not match any entry in validityArea for the corresponding carrier frequency, the timer T331 is stopped. Then, the UE stops performing IDLE measurements and releases the idle mode measurement configuration (i.e., VarMeasIdleConfig). This does not necessarily mean that the UE releases the idle measurement results that were configured and that were performed i.e. these may still be stored and possibly requested by the network. In addition, the UE may continue with IDLE mode measurements according to the broadcasted SIBS configuration after the timer T331 has expired or stopped.

Only measurements above a certain threshold shall be stored because the cell candidates for CA setup needs to be within a minimum acceptable threshold. How the UE performs measurements in IDLE mode is up to UE implementation as long as RAN4 requirements for measurement reporting defined in 36.133 are met.

The UE behaviour in more details is shown below as captured in 36.331:

5.6.20 Idle Mode Measurements
5.6.20.1    General
This procedure specifies the measurements done by a UE in RRC_IDLE when it has an IDLE mode measurement configuration and the storage of the available measurements by a UE in both RRC_IDLE and RRC_CONNECTED.
5.6.20.2    Initiation
While T331 is running, the UE shall:
   1>perform the measurements in accordance with the following:
      2>for each entry in measIdleCarrierListEUTRA within VarMeasIdleConfig:
         3>if UE supports carrier aggregation between serving carrier and the carrier
            frequency and bandwidth indicated by carrierFreq and allowedMeasBandwidth
            within the corresponding entry;
            4>perform measurements in the carrier frequency and bandwidth indicated by
               carrierFreq and allowedMeasBandwidth within the corresponding entry;
            NOTE: The fields s-NonIntraSearch in SystemInformationBlockTyped do not
            affect the UE measurement procedures in IDLE mode. How the UE performs
            measurements in IDLE mode is up to UE implementation as long as the
            requirements in TS 36.133 [16] are met for measurement reporting. UE is not
            required to perform idle measurements if SIB2 idle measurement indication is not
            configured.
      4>if the measCellList is included:
         5>consider PCell and cells identified by each entry within the measCellList to
            be applicable for idle mode measurement reporting;
      4>else:
         5>consider PCell and up to maxCellMeasIdle strongest identified cells whose RSRP/RSRQ measurement results are above the value(s) provided in qualityThreshold (if any) to be applicable for idle mode measurement reporting;
    4>store measurement results for cells applicable for idle mode measurement reporting within the VarMeasIdleReport;
   3>else:
    4>do not consider the carrier frequency to be applicable for idle mode measurement reporting;
1>if validityArea is configured in VarMeasIdleConfig and UE reselects to a serving cell whose physical cell identity does not match any entry in validityArea for the corresponding carrier frequency:
  2>stop T331;
5.6.20.3   T331 expiry or stop
The UE shall:
  1>if T331 expires or is stopped:
    2>release the VarMeasIdleConfig;
NOTE: It is up to UE implementation whether to continue IDLE mode measurements according to SIB5 configuration after T331 has expired or stopped.

Some implementations include an indication of available early measurements upon resume/setup in LTE. For example, when the UE tries to resume or setup a call from RRC_IDLE without context, if the previous step is performed, i.e., if the UE is configured to store idle measurements, the network may request the UE after resume/setup (after security is activated) whether the UE has idle measurements available.

If the UE is setting up a connection coming from RRC_IDLE without the AS Context, the network is not aware that the UE has available measurements stored. Then, to enable the network to know that, and possibly request the UE to report early measurements, the UE may indicate the availability of stored idle measurements in RRCConnectionSetupComplete. Because not all cells support the feature, the UE only includes that availability information if the cell broadcasts in SIB2 the idleModeMeasurements indication. The flag in RRCReconnectionSetupComplete and procedure text are shown below:

```
RRCConnectionSetupComplete-v1530-IEs ::= SEQUENCE {
    logMeasAvailableBT-r15          ENUMERATED {true}
                                    OPTIONAL,
    logMeasAvailableWLAN-r15        ENUMERATED {true}
                                    OPTIONAL,
    idleMeasAvailable-r15           ENUMERATED {true}
                                    OPTIONAL,
    flightPathInfoAvailable-r15     ENUMERATED {true}
                                    OPTIONAL,
    connectTo5GC-r15                ENUMERATED {true}
                                    OPTIONAL,
    registeredAMF-r15               RegisteredAMF-r15
                                    OPTIONAL,
    s-NSSAI-list-r15                SEQUENCE(SIZE (1..maxNrofS-
    NSSAI-r15) ) OF S-NSSAI-r15 OPTIONAL,
    ng-5G-S-TMSI-Bits-r15           CHOICE {
        ng-5G-S-TMSI-r15                NG-5G-S-TMSI-r15,
        ng-5G-S-TMSI-Part2-r15          BIT STRING (SIZE (8) )
    }                                                   OPTIONAL,
    nonCriticalExtension            RRCConnectionSetupComplete-v1540-
                                    IEs
                                    OPTIONAL
}
```

5.3.3.4 Reception of the RRCConnectionSetup by the UE
    NOTE 1: Prior to this, lower layer signalling is used to allocate a C-RNTI. For further details see TS 36.321;
The UE shall:
  1>if the RRCConnectionSetup is received in response to an RRCConnectionResumeRequest from a suspended RRC connection:
    . . .
  1>set the content of RRCConnectionSetupComplete message as follows:
    2>if the RRCConnectionSetup is received in response to an RRCConnectionResumeRequest:
    . . .
    2>if the UE is connected to EPC:
      3>except for NB-IoT:
        . . .
        4>if the SIB2 contains idleModeMeasurements, and the UE has IDLE mode measurement information available in VarMeasIdleReport:
          5>include the idleMeasAvailable;
        4>stop T331 (if running);
        . . .
      3>forNB-IoT:
        4>if the UE supports serving cell idle mode measurements reporting and servingCellMeasInfo is present in SystemInformationBlockType2-NB:
          5>set the measResultServCell to include the measurements of the serving cell;
        NOTE 2: The UE includes the latest results of the serving cell measurements as used for cell selection/ reselection evaluation, which are performed in accordance with the performance requirements as specified in TS 36.133.
      3>include dcn-ID if a DCN-ID value (see TS 23.401) is received from upper layers;

If the UE is setting up a connection coming from RRC_IDLE but with a stored AS Context (i.e., resume from suspended), the network may be aware that the UE may have available idle measurements stored after checking the fetched context from the source node where the UE got suspended. However, it is still not certain that the UE has measurements available because the UE is only required to perform the measurements if the cells are above the configured RSRP/RSRQ thresholds and while it performs cell selection/cell reselection within the configured validity area. Then, to enable the network to know that, and possibly request the UE to report early measurements, the UE may also indicate the availability of stored idle measurements in RRCConnectionResumeComplete. Because not all cells support the feature, the UE only includes that availability information if the cell broadcasts in SIB2 the idleModeMeasurements indication. The flag in RRCReconnectionResumeComplete and procedure text are shown below:

```
RRCConnectionResumeComplete-v1530-IEs ::= SEQUENCE {
    logMeasAvailableBT-r15         ENUMERATED {true}
OPTIONAL,
    logMeasAvailableWLAN-r15       ENUMERATED {true}
OPTIONAL,
    idleMeasAvailable-r15          ENUMERATED {true}
OPTIONAL,
    flightPathInfoAvailable-r15    ENUMERATED {true}
OPTIONAL,
    nonCriticalExtension           SEQUENCE { }      OPTIONAL
}
```

5.3.3.4a   Reception of the RRCConnectionResume by the UE
The UE shall:
. . .
1>set the content of RRCConnectionResumeComplete message as follows:
   2>except for NB-IoT:
     . . .
     3>if the SIB2 contains idleModeMeasurements, and the UE has IDLE mode
      measurement information available in VarMeasIdleReport:
       4>include the idleMeasAvailable;
     3>stop T331 (if running);
   2>forNB-IoT:
     3>if the UE supports serving cell idle mode measurements reporting and
      servingCellMeasInfo is present in SystemInformationBlockType2-NB:
       4>set the measResultServCell to include the measurements of the serving cell;
       NOTE: The UE includes the latest results of the serving cell measurements as
       used for cell selection/ reselection evaluation, which are performed in accordance
       with the performance requirements as specified in TS 36.133.
1>submit the RRCConnectionResumeComplete message to lower layers for transmission;
1>the procedure ends.

Some implementations include reporting of early measurements upon resume/setup in LTE. After the UE indicates to the target cell upon resume or setup that idle measurements are available, the network may request the UE to report these available measurements by including the field idleModeMeasurementReq in the UEInformationRequest message transmitted to the UE. Then, the UE responds with a UEInformationResponse containing these measurements. An example is illustrated in FIG. 4.

The procedure text is reproduced below.

5.6.5.3 Reception of the UEInformationRequest message
Upon receiving the UEInformationRequest message, the UE shall, only after successful security activation:
...
1> if the idleModeMeasurementReq is included in the UEInformationRequest and UE has stored VarMeasIdleReport:
   2>set the measResultListIdle in the UEInformationResponse message
     to the value of idleMeasReport in the VarMeasIdleReport;
   2>discard the VarMeasIdleReport upon successful delivery of the
     UEInformationResponse message confirmed by lower layers;
. ...

UEInformationResponse Message

```
-- ASN1START
UEInformationResponse-r9 ::=   SEQUENCE {
    rrc-TransactionIdentifier     RRC-TransactionIdentifier,
    criticalExtensions            CHOICE {
        c1                          CHOICE {
            ueInformationResponse-r9    UEInformationResponse-r9-IEs,
            spare3 NULL, spare2 NULL, spare1 NULL
        },
        criticalExtensionsFuture     SEQUENCE { }
    }
}
```

-continued

```
UEInformationResponse-v1530-IEs ::= SEQUENCE {
    measResultListIdle-r15       MeasResultListIdle-r15    OPTIONAL,
    flightPathInfoReport-r15     FlightPathInfoReport-r15  OPTIONAL,
    nonCriticalExtension         SEQUENCE { }              OPTIONAL
}
```

5.6.20 Idle Mode Measurements
5.6.20.1   General
This procedure specifies the measurements done by a UE in RRC_IDLE when it has an IDLE mode measurement configuration and the storage of the available measurements by a UE in both RRC_IDLE and RRC_CONNECTED.
5.6.20.2   Initiation
While T331 is running, the UE shall:

-continued

```
1>perform the measurements in accordance with the following:
    2>for each entry in measIdleCarrierListEUTRA within VarMeasIdleConfig:
        3>if UE supports carrier aggregation between serving carrier and the carrier
          frequency and bandwidth indicated by carrierFreq and allowedMeasBandwidth
          within the corresponding entry;
            4>perform measurements in the carrier frequency and bandwidth indicated by
              carrierFreq and allowedMeasBandwidth within the corresponding entry;
            NOTE: The fields s-NonIntraSearch in SystemInformationBlockType3 do not
              affect the UE measurement procedures in IDLE mode. How the UE performs
              measurements in IDLE mode is up to UE implementation as long as the
              requirements in TS 36.133 are met for measurement reporting. UE is not required
              to perform idle measurements if SIB2 idle measurement indication is not
              configured.
            4>if the measCellList is included:
                5>consider PCell and cells identified by each entry within the measCellList to
                  be applicable for idle mode measurement reporting;
            4>else:
                5>consider PCell and up to maxCellMeasIdle strongest identified cells whose
                  RSRP/RSRQ measurement results are above the value(s) provided in
                  qualityThreshold (if any) to be applicable for idle mode measurement
                  reporting;
            4>store measurement results for cells applicable for idle mode measurement
              reporting within the VarMeasIdleReport;
        3>else:
            4>do not consider the carrier frequency to be applicable for idle mode
              measurement reporting;
1>if validityArea is configured in VarMeasIdleConfig and UE reselects to a serving cell
  whose physical cell identity does not match any entry in validityArea for the
  corresponding carrier frequency:
    2>stop T331;
5.6.20.3    T331 expiry or stop
The UE shall:
    1>ifT331 expires or is stopped:
        2> release the VarMeasIdleConfig;
NOTE: It is up to UE implementation whether to continue IDLE mode measurements
according to SIB5 configuration after T331 has expired or stopped.
```

There currently exist certain challenges. For example, in LTE euCA, the UE can be configured with idle mode measurement configurations comprising a validity area. The validity area is configured as a list of cells per frequency in the idle mode measurement configuration (MeasIdleConfig), and may be configured for one, several or all the frequencies that are part of the idle mode measurement configuration.

In case a validity area is configured, i.e. the validity area is configured for any of the frequencies in MeasIdleConfig, then the UE shall consider itself to be outside the validity area if it reselects to either a carrier that does not have any validity area configured or a cell on a carrier for which a validity area is configured but the PCI for the cell is not included in that validity area. In such case, the UE stops timer T331, and thus releases the idle measurement configuration.

A problem with the existing configuration of validity area in LTE is that each carrier where the UE should be allowed to be camping while still being within the validity area needs to be part of the idle mode measurement configuration (MeasIdleConfig). Because the idle mode measurement configuration is for measurements of carriers that should be added as SCell in a CA configuration or (in Rel-16) as SCG in an MR-DC configuration, the carriers are in many cases not suitable or likely to be camped on. If the validity area, which relates to areas of camping, is included in the idle mode measurement configuration this will need to include carriers (frequencies) that are not useful for the idle/inactive mode measurements (or early measurements). This can additionally cause problems because there is a restriction on the number of carriers that can be included in the idle mode measurement configuration.

In LTE, if the UE reselects to a carrier that does not include a validity area, i.e. list of cells that are part of the validity area, then it considers itself to be outside the validity area. However, in many cases, the desired configuration would be that the UE continues the idle/inactive mode measurements (or early measurements) when it is camping on a specific carrier, independent on what cell it is camping on. This is e.g. the case if a CA or DC configuration is supported for all the cells on a certain carrier, which could be a typical case. The network is however not able to configure a validity area that includes a whole carrier (frequency).

The procedure text is reproduced below.

```
36.331 (v15.7.0), sub-clause 5.6.20.2:
[...]
    1>if validityArea is configured in VarMeasIdleConfig and UE reselects
      to a serving cell whose physical cell identity does not match any
      entry in validityArea for the corresponding carrier frequency:
        2>stop T331;
[...]
36.331 (v15.7.0), sub-clause 6.3.5:
[...]
-   MeasIdleConfig
```

The IE MeasIdleConfig is used to convey information to UE about measurements requested to be done while in RRC_IDLE or RRC_INACTIVE.

MeasIdleConfig information element

```
-- ASN1START
MeasIdleConfigSIB-r15 ::= SEQUENCE {
    measIdleCarrierListEUTRA-r15 EUTRA-CarrierList-r15,
    ...
```

| MeasIdleConfig information element |
| --- |
| }<br>MeasIdleConfigDedicated-r15 ::= SEQUENCE {<br>   measIdleCarrierListEUTRA-r15  EUTRA-CarrierList-r15   OPTIONAL,<br>-<br>- Need OR<br>   measIdleDuration-r15     ENUMERATED {sec10, sec30, sec60,<br>                               sec120, sec180, sec240, sec300,<br>                               spare},<br>   ...<br>}<br>EUTRA-CarrierList-r15 ::= SEQUENCE (SIZE (1..maxFreqIdle-r15)) OF<br>MeasIdleCarrierEUTRA-r15<br>MeasIdleCarrierEUTRA-r15::=     SEQUENCE {<br>   carrierFreq-r15             ARFCN-ValueEUTRA-r9,<br>   allowedMeasBandwidth-r15   AllowedMeasBandwidth,<br>   validityArea-r15           CellList-r15         OPTIONAL, --<br>Need OR<br>   measCellList-r15          CellList-r15         OPTIONAL, --<br>Need OR<br>   reportQuantities           ENUMERATED {rsrp, rsrq, both},<br>   qualityThreshold-r15       SEQUENCE {<br>      idleRSRP-Threshold-r15     RSRP-Range        OPTIONAL, -<br>- Need OR<br>      idleRSRQ-Threshold-r15     RSRQ-Range-r13    OPTIONAL, -<br>- Need OR<br>   }                                                                  OPTIONAL, --<br>Need OP<br>   ...<br>}<br>CellList-r15 ::=     SEQUENCE (SIZE (1.. maxCellMeasIdle-r15)) OF<br>PhysCellIdRange<br>-- ASN1STOP |

| MeasIdleConfig field descriptions |
| --- |
| allowedMeasBandwidth |
| If absent, the value corresponding to the downlink bandwidth indicated by the dl-Bandwidth included in MasterInformationBlock of serving cell applies. |
| carrierFreq |
| Indicates the E-UTRA carrier frequency to be used for measurements during RRC_IDLE or RRC_INACTIVE mode. |
| measIdleCarrierListEUTRA |
| Indicates the E-UTRA carriers to be measured during RRC_IDLE or RRC_INACTIVE mode. |
| measIdleDuration |
| Indicates the duration for performing measurements during RRC_IDLE or RRC_INACTIVE mode for measurements assigned via RRCConnectionRelease. Value sec10 correspond to 10 seconds, value sec30 to 30 seconds and so on. |
| qualityThreshold |
| Indicates the quality thresholds for reporting the measured cells for IDLE mode measurements. If absent, PCell and up to maxCellMeasIdle strongest identified cells are considered for idle mode measurement reporting. |
| reportQuantities |
| Indicates which measurment quantities UE is requested to report in the idle mode measurement report. |
| measCellList |
| Indicates the list of cells which the UE is requested to measure and report for IDLE mode measurements. |
| validityArea |
| Indicates the list of cells within which UE is requested to do IDLE mode measurements. If the UE reselects to a cell whose physical cell identity does not match any entry in validityArea for the corresponding carrier frequency, the measurements are no longer required. E-UTRAN configures this field only in RRCConnectionRelease. |

As a summary, a shortcoming of this approach is that the network can configure a validity area only comprising cells that are operating on frequencies that the UE is configured to perform early measurements on. For example, the network is not able to configure a validity area of cells operating on frequency x if the UE was not configured to perform early measurements on frequency x.

Additionally, the LTE euCA signaling for validity area only allows limiting the cells/frequencies where the UE is mandated to perform measurements. But it does not allow the possibility to make a certain serving frequency valid for early measurements regardless of the particular cell. For example, the network may have a very good complete coverage at a low frequency x and it can perform CA with many other frequencies and the frequency x, and as such it may want to configure the UE to perform early measurements whenever the UE is camping on a cell operating at that frequency. Current signaling doesn't allow that, as the list of valid cells have to be included per validity area carrier.

SUMMARY

Based on the description above, certain challenges currently exist with validity areas for early measurements. Certain aspects of the present disclosure and their embodiments may provide solutions to these or other challenges. For example, some embodiments include methods performed by a wireless device for controlling the way the wireless device performs idle/inactive measurements while in a dormant state (RRC_IDLE, RRC_IDLE with suspended, or RRC_INACTIVE). For example, particular embodiments include receiving a configuration for idle/inactive measurements in an RRC Release message while transitioning to RRC_IDLE or RRC_INACTIVE. The configurations comprises a validity area. Particular embodiments configure validity area comprising of cells operating on frequencies that the UE is not configured to measure during idle/inactive modes. Particular embodiments configure validity area in such a way that the UE performs measurements while camping on any cell operating at a given frequency.

In some embodiments, if the cell list is present for a particular frequency in the validity area, the validity area only includes the cells in the cell list for that particular frequency. If a validity area is included for a particular frequency in the validity area, but the cell list is absent for, the validity area includes any cell operating on that frequency. If the UE is configured with a validity area, it will continue to perform idle/inactive measurements while it is camping on any cell belonging to the validity area, and if the UE re-selects to a cell which is not part of the validity area, the UE may stop performing idle/inactive measurements.

In general, particular embodiments enable the configuration of a validity area, where if the UE is camping on a cell within the validity area, the UE shall perform idle/inactive measurements. The validity area comprises carrier frequencies which may be different than the carrier frequencies the UE is configured to perform early measurements on and an optional list of cells, where the UE can be configured to consider any cell on a particular carrier frequency to be part of the validity area.

According to some embodiments, a method performed by a wireless device for performing early measurement comprises receiving an early measurement configuration for performing idle/inactive mode measurements. The early measurement configuration comprising a measurement carrier list. Each entry of the measurement carrier list comprises a carrier frequency and one or more cell identifiers associated with the carrier frequency for which the wireless device is to perform idle/inactive mode measurements. The early measurement configuration further comprises a validity area list, separate from the measurement carrier list. Each entry of the validity area list comprises a carrier frequency and zero or more cell identifiers associated with the carrier frequency for which the wireless device is supposed to perform idle/inactive mode measurements. The method further comprises reselecting to a new cell and determining whether to perform idle/inactive mode measurements while camping on the new cell based on the validity area list.

A particular advantage is the validity area list is decoupled from the measurement carrier list, facilitating improved configuration flexibility.

In particular embodiments, determining the wireless device may perform idle/inactive mode measurements while camping on the new cell comprises determining that a carrier frequency of the new cell matches a carrier frequency in the validity area list. For example, when an entry in the validity area list includes a carrier frequency and zero associated cell identifiers, then the entry is valid for any cell that uses the carrier frequency.

In particular embodiments, determining the wireless device may perform idle/inactive mode measurements while camping on the new cell comprises further determining that a carrier frequency and a cell identifier of the new cell matches a carrier frequency and an associated cell identifier in the validity area list.

In particular embodiments, the carrier frequencies in the validity area list differ by at least one carrier frequency from the carrier frequencies in the measurement carrier list.

In particular embodiments, the method further comprises upon determining the wireless device may not perform idle/inactive mode measurements while camping on the new cell, stopping a measurement timer.

According to some embodiments, a wireless device is capable of performing early measurements. The wireless device comprises processing circuitry operable to perform any of the wireless device methods described above.

According to some embodiments, a method performed by a network node for configuring early measurement for a wireless device comprises generating an early measurement configuration for performing idle/inactive mode measurements. The early measurement configuration comprises a measurement carrier list. Each entry of the measurement carrier list comprises a carrier frequency and one or more cell identifiers associated with the carrier frequency for which the wireless device is to perform idle/inactive mode measurements. The early measurement configuration further comprising a validity area list, separate from the measurement carrier list. Each entry of the validity area list comprises a carrier frequency and zero or more cell identifiers associated with the carrier frequency for which the wireless device is supposed to perform idle/inactive mode measurements. The method further comprises transmitting the early measurement configuration to the wireless device.

In particular embodiments, the validity area list indicates that the wireless device may perform idle/inactive mode measurements while camping on a new cell when a carrier frequency of the new cell matches a carrier frequency in the validity area list. For example, when an entry in the validity area list includes a carrier frequency and zero associated cell identifiers, then the entry is valid for any cell that uses the carrier frequency.

In particular embodiments, the validity area list indicates that the wireless device may perform idle/inactive mode measurements while camping on a new cell when a carrier frequency and a cell identifier of the new cell matches a carrier frequency and an associated cell identifier in the validity area list.

In particular embodiments, the carrier frequencies in the validity area list differ by at least one carrier frequency from the carrier frequencies in the measurement carrier list.

According to some embodiments, a network node is capable of configuring early measurement for a wireless device. The network node comprises processing circuitry operable to perform any of the network node methods described above.

Also disclosed is a computer program product comprising a non-transitory computer readable medium storing computer readable program code, the computer readable program code operable, when executed by processing circuitry to perform any of the methods performed by the wireless device described above.

Another computer program product comprises a non-transitory computer readable medium storing computer readable program code, the computer readable program code operable, when executed by processing circuitry to perform any of the methods performed by the network node described above.

Certain embodiments may provide one or more of the following technical advantages. For example, in some embodiments the network can configure the cells/frequencies where the UE should perform early measurements separately from the frequencies that the UE is configured to measure while in RRC_IDLE/RRC_INACTIVE. In addition to that, it is also possible to white-list certain frequencies, where the network can configure the UE to perform early measurements while camping on any cell operating at the frequency.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
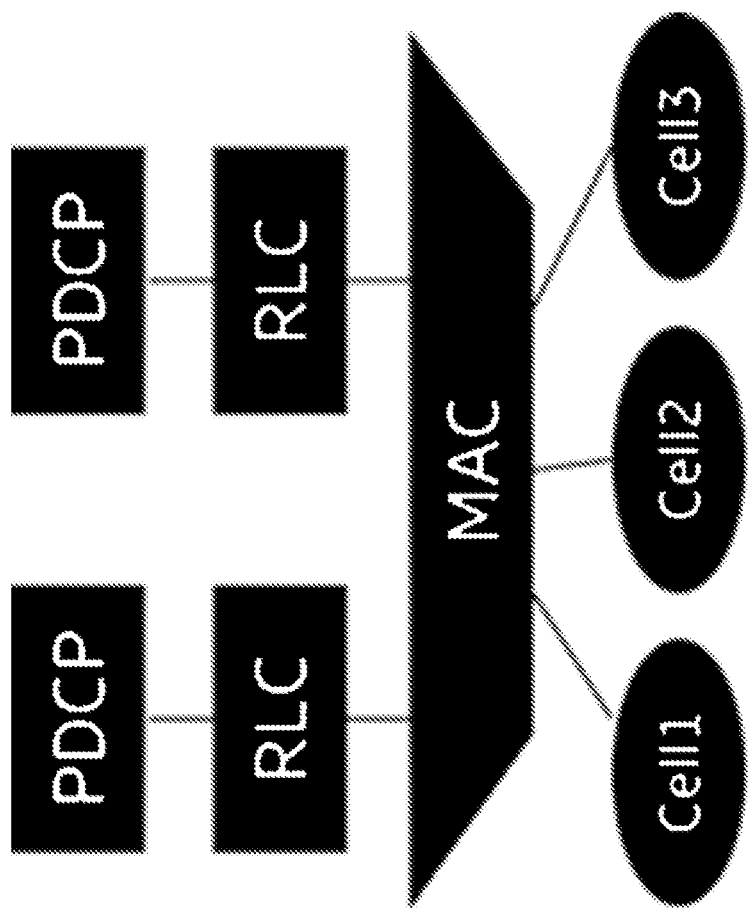
FIG. 1 is a block diagram illustrating an example of carrier aggregation (CA)
Figure 2:
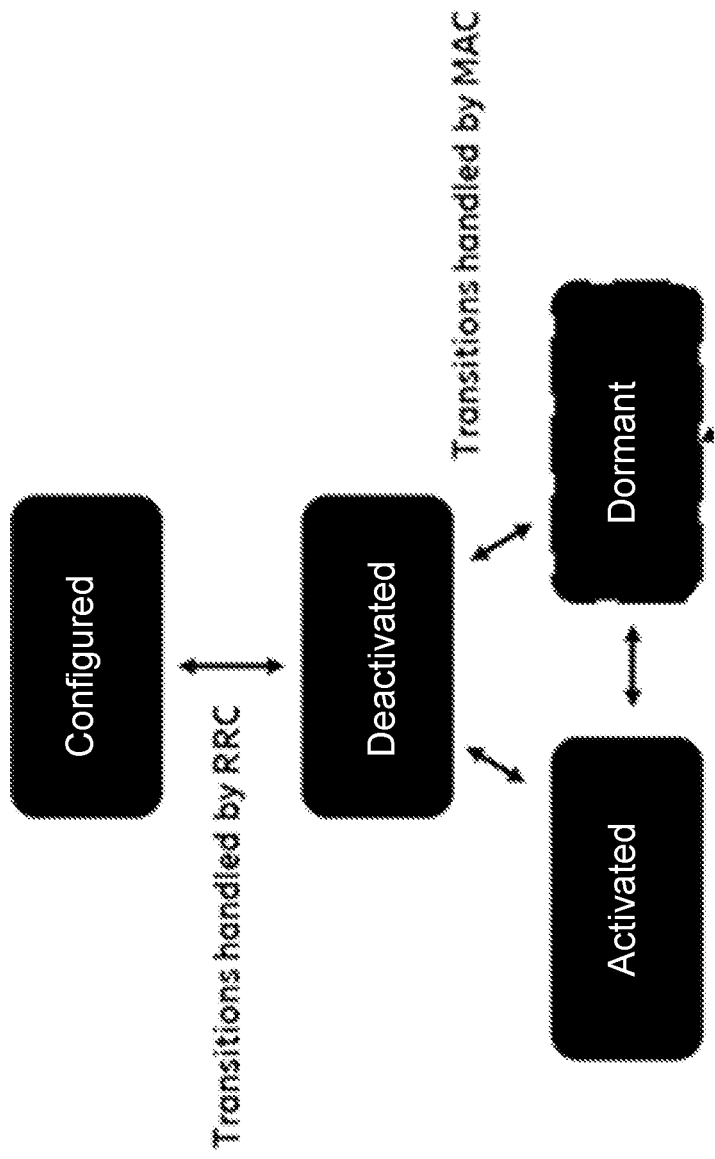
FIG. 2 is a state diagram illustrating a cell transition between activated, deactivated, and dormant states.
Figure 3:
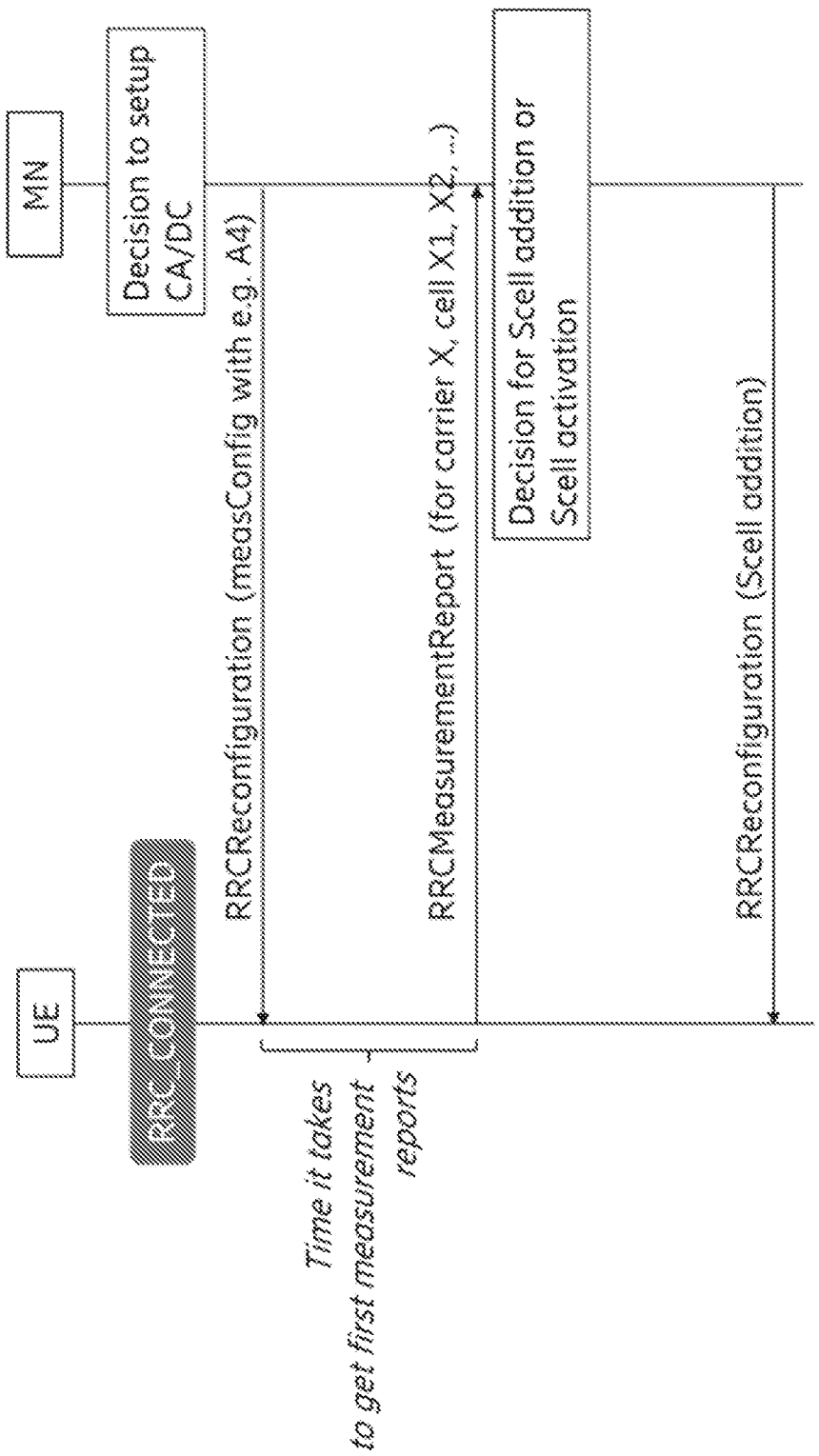
FIG. 3 is a flow diagram illustrating carrier aggregation and/or dual connectivity setup.
Figure 4:
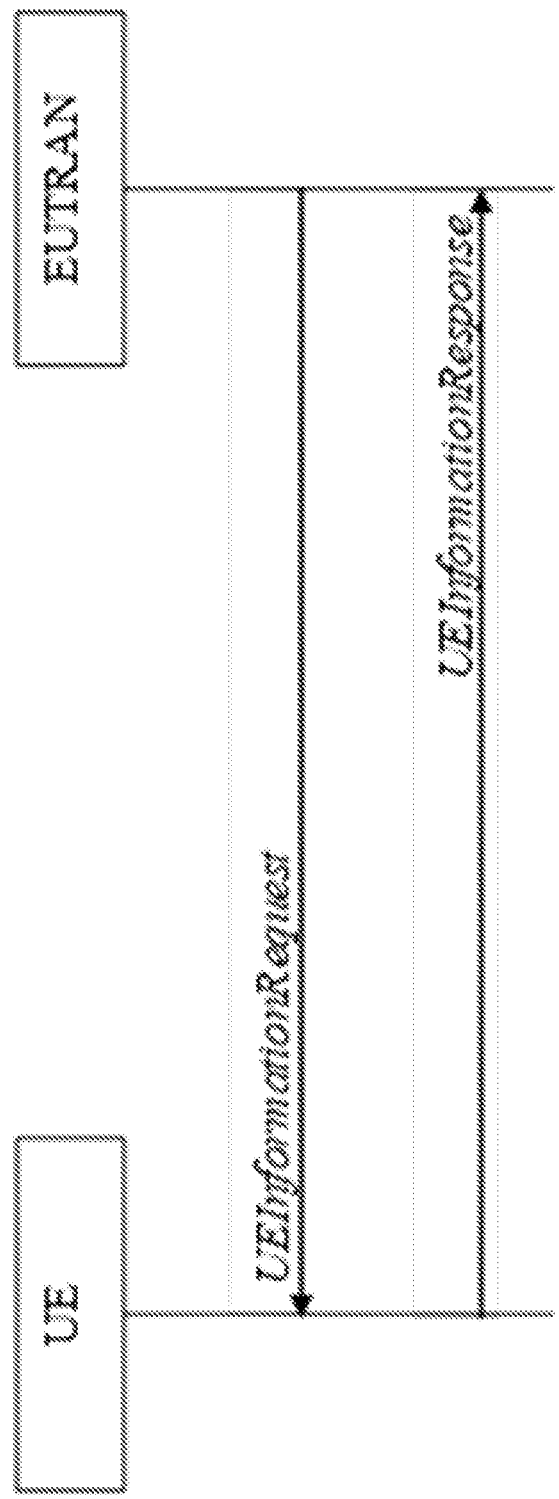
FIG. 4 is a flow diagram illustrating an example UE request/response.

As described above, certain challenges currently exist with validity areas for early measurements. Certain aspects of the present disclosure and their embodiments may provide solutions to these or other challenges. For example, particular embodiments configure validity area comprising of cells operating on frequencies that the user equipment (UE) is not configured to measure during idle/inactive modes. Particular embodiments configure validity area in such a way that the UE performs measurements while camping on any cell operating at a given frequency.

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The embodiments and examples herein are described with respect to methods, signaling and procedures for fifth generation (5G) new radio (NR). However, the embodiments and examples are equally applicable to evolved universal terrestrial radio access (E-UTRA) and other wireless networks. The terms idle/inactive measurements and early measurements are used inter-changeably herein.

In long term evolution (LTE) euCA, a UE can be configured to perform idle/inactive mode measurements to be reported after the UE returns to RRC_CONNECTED. The early measurement configurations may optionally contain a validity area, which are signaled as a physical cell identifier (PCI) per carrier the UE is configured to measure on.

If the UE re-selects to a cell with a frequency and PCI matching the validity area, the UE continues to perform measurements. However, if the UE re-selects to a cell on a carrier where the validity area does not include the PCI, the UE stops the early measurements and deletes the early measurement configurations.

NR may also include a validity area. The LTE design of the validity area meant that the validity area could only contain cells on frequencies that the UE was configured to perform early measurements on (as the same carrier list was used to indicate which carriers to measure, and which carriers the cells in the validity area belonged to).

If the network wants to configure a validity area with cells that are on a frequency that the UE could re-select to, but which would not be relevant for early measurements, e.g. a low bandwidth carrier on a low frequency applicable for robustness but not useful for carrier aggregation (CA)/dual connectivity (DC), the network would still have to configure early measurements on that carrier to enable the cells to belong to the validity area.

To avoid this restriction in NR, particular embodiments define a validity area separate from the idle/inactive measurement carrier list. In addition, when the validity area is defined separately from the carrier list to measure, the validity area may comprise a set of carriers instead of a set of cells.

In particular embodiments, the validity area is defined as a carrier list (which could be different from the carriers to be measured during RRC_IDLE/INACTIVE) with optional PCI list per carrier. In addition, because it is possible to configure the idle/inactive measurements for only a particular frequency (i.e. without indicating a cell list), particular embodiments may configure a validity area comprising frequencies without indicating a cell list.

In some embodiments, the cell list in the validity area is optional to facilitate idle/inactive measurements while camping on any cell on that frequency.

An example ASN.1 and procedural handling of the validity area is shown below.

```
MeasIdleConfigDedicated-r16 ::= SEQUENCE {
    measIdleCarrierListNR-r16           NR-CarrierList-r16
OPTIONAL,      -- Need FFS
    measIdleCarrierListEUTRA-r16        EUTRA-CarrierList-r16
OPTIONAL,      -- Need FFS
    measIdleDuration-r16                FFS-Value,
    validityAreaList-r16                ValidityAreaList-r16
OPTIONAL,      -- Need N
    ...
}
ValidityAreaList-r16 ::= SEQUENCE (SIZE (1..maxFreq)) OF
ValidityArea-r16
ValidityArea-r16 ::= SEQUENCE {
    carrierFreq-r16                     ARFCN-ValueNR,
    validityCellList-r16                ValidityCellList
OPTIONAL      -- Need N
}
ValidityCellList :: = SEQUENCE (SIZE (1..maxCellInter)) OF PhysCellId
```

```
1> if validityAreaList is configured in VarMeasIdleConfig:
2>     if the UE reselects to a serving cell on a frequency, which does
   not match the carrierFreq of any entry in the validityAreaList;
    3>stop T331;
2>else:
    3>if validityCellList is included for the corresponding frequency:
        4>if the physical cell identity of the serving cell does not match
          any entry in validityCellList:
            5>stop T331;
```

In some embodiments, the UE is not mandated to continue performing early measurements when T331 is stopped, but it can continue to perform the measurements based on UE implementation (i.e., as in LTE euCA).

Figure 5:
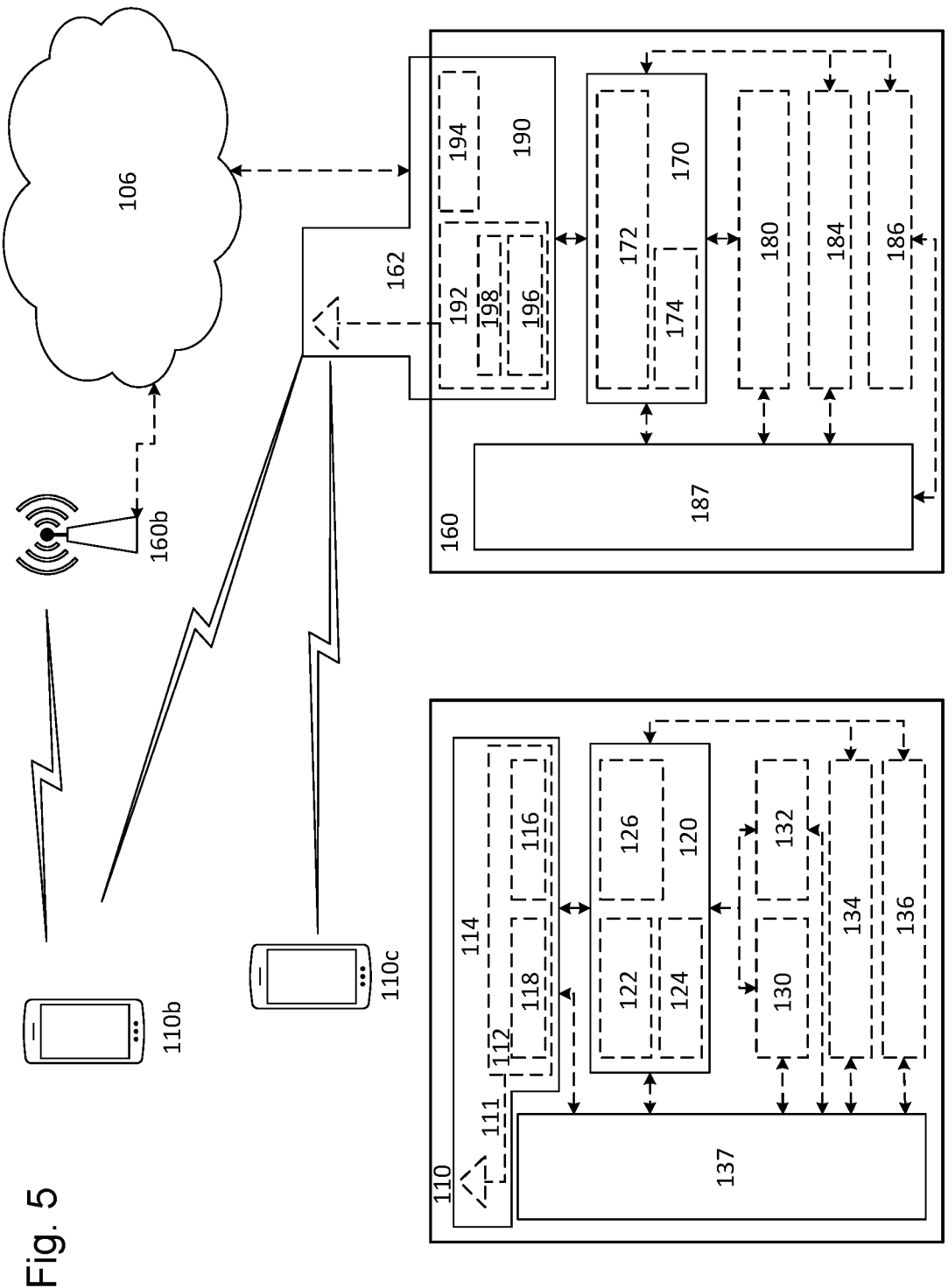
FIG. 5 is a block diagram illustrating an example wireless network.

FIG. 5 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 5, network node 160 includes processing circuitry 170, device readable medium 180, interface 190, auxiliary equipment 184, power source 186, power circuitry 187, and antenna 162. Although network node 160 illustrated in the example wireless network of FIG. 5 may represent a device that includes the illustrated combination of hardware components, other embodiments may comprise network nodes with different combinations of components.

It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160.

For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 5 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner.

In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 5. For simplicity, the wireless network of FIG. 5 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 6:
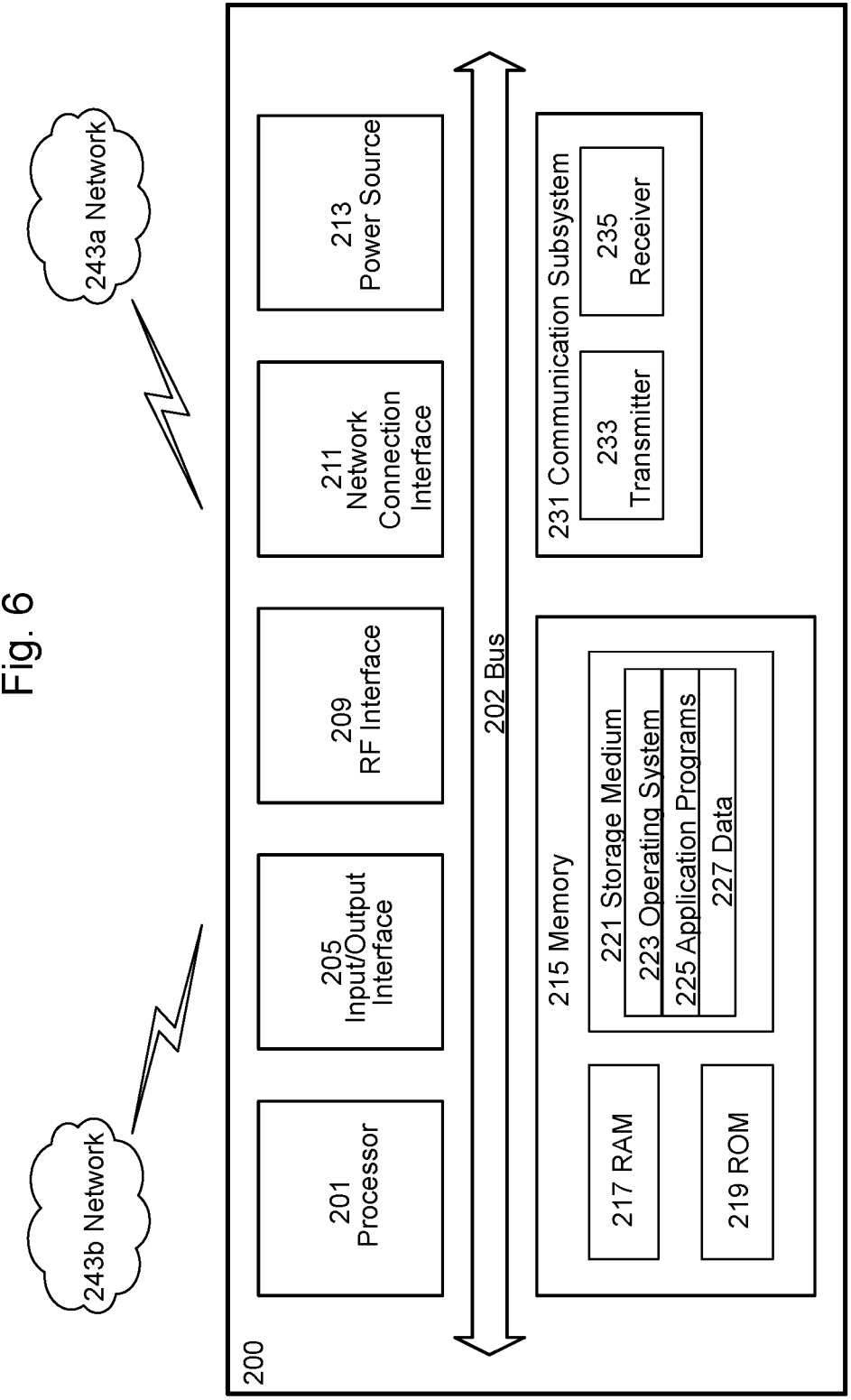
FIG. 6 illustrates an example user equipment, according to certain embodiments.

FIG. 6 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 6, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 6 is a UE, the components discussed herein are equally applicable to a WD, and vice-versa.

In FIG. 6, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 213, and/or any other component, or any combination thereof. Storage medium 221 includes operating system 223, application program 225, and data 227. In other embodiments, storage medium 221 may include other similar types of information. Certain UEs may use all the components shown in FIG. 6, or only a subset of the components. The level of integration between the components may vary from one UE to another UE. Further, certain UEs may contain multiple instances of a component, such as multiple processors, memories, transceivers, transmitters, receivers, etc.

In FIG. 6, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 6, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 6, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, U IRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 7:
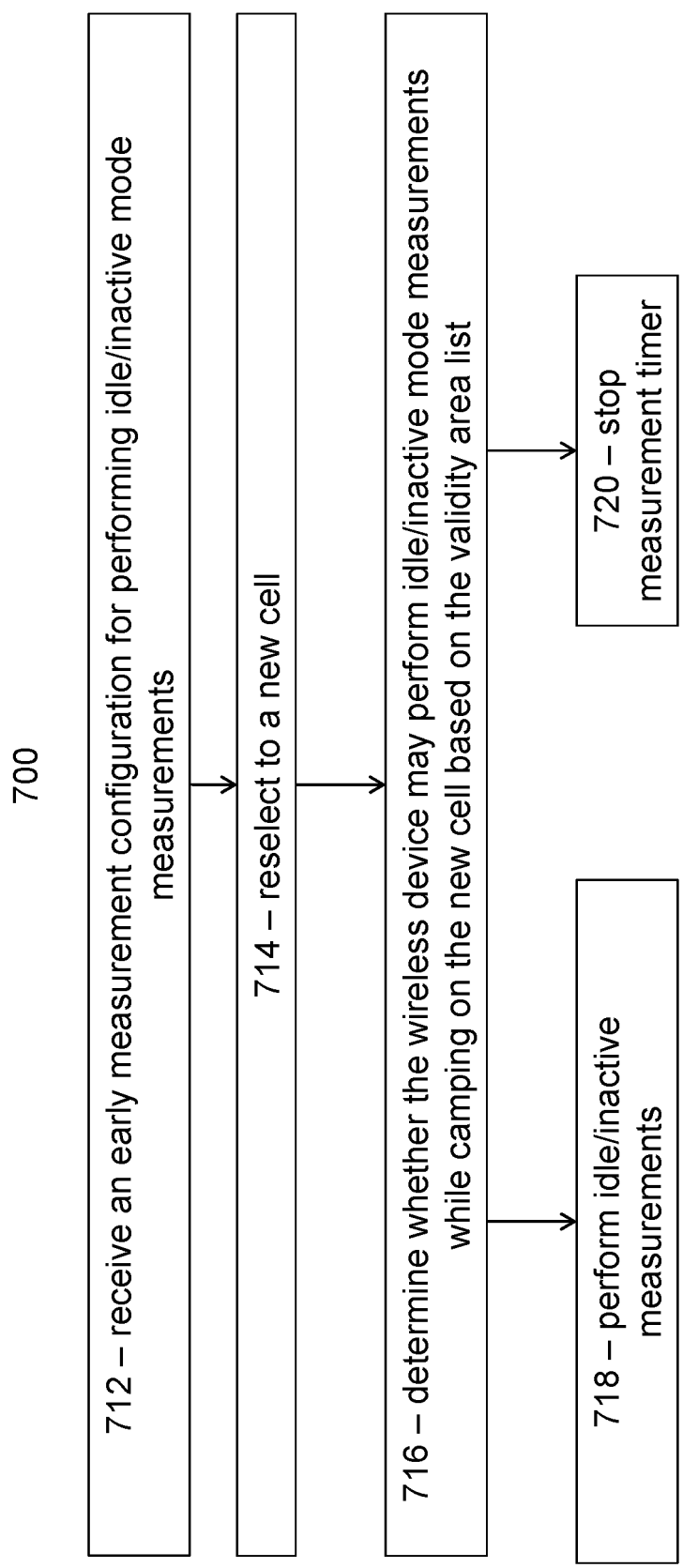
FIG. 7 is flowchart illustrating an example method in a wireless device, according to certain embodiments.

FIG. 7 is a flowchart illustrating an example method in a wireless device, according to certain embodiments. In particular embodiments, one or more steps of FIG. 7 may be performed by wireless device 110 described with respect to FIG. 5.

The method may begin at step 712, where the wireless device (e.g., wireless device 110) receives an early measurement configuration for performing idle/inactive mode measurements. The early measurement configuration comprises a measurement carrier list and a validity area list.

Each entry of the measurement carrier list comprises a carrier frequency and one or more cell identifiers associated with the carrier frequency for which the wireless device is to perform idle/inactive mode measurements. The validity area list is separate from the measurement carrier list.

Each entry of the validity area list comprises a carrier frequency and zero or more cell identifiers associated with the carrier frequency for which the wireless device is supposed to perform idle/inactive mode measurements.

Accordingly, as described in more detail above, the validity area list is decoupled from the measurement carrier list, which facilitates improved configuration flexibility. In particular embodiments, the carrier frequencies in the validity area list differ by at least one carrier frequency from the carrier frequencies in the measurement carrier list.

At step 714, the wireless device reselects to a new cell. The wireless device then needs to determine what kind of early measurements, if any, the wireless device should perform.

At step 716, the wireless device determines whether to perform idle/inactive mode measurements while camping on the new cell based on the validity area list. For example, in particular embodiments, the wireless device may determine that a carrier frequency of the new cell matches a carrier frequency in the validity area list. As one example, when an entry in the validity area list includes a carrier frequency and zero associated cell identifiers, then the entry is valid for any cell that uses the carrier frequency.

In particular embodiments, the wireless device may further determine that a carrier frequency and a cell identifier of the new cell matches a carrier frequency and an associated cell identifier in the validity area list.

Based on the validity area list, the wireless device either continues to step 718, where it performs the idle/inactive mode measurements, or to step 720 where the wireless device stops the measurement timer and does not perform idle/inactive mode measurements.

Modifications, additions, or omissions may be made to method 700 of FIG. 7. Additionally, one or more steps in the method of FIG. 7 may be performed in parallel or in any suitable order.

Figure 8:
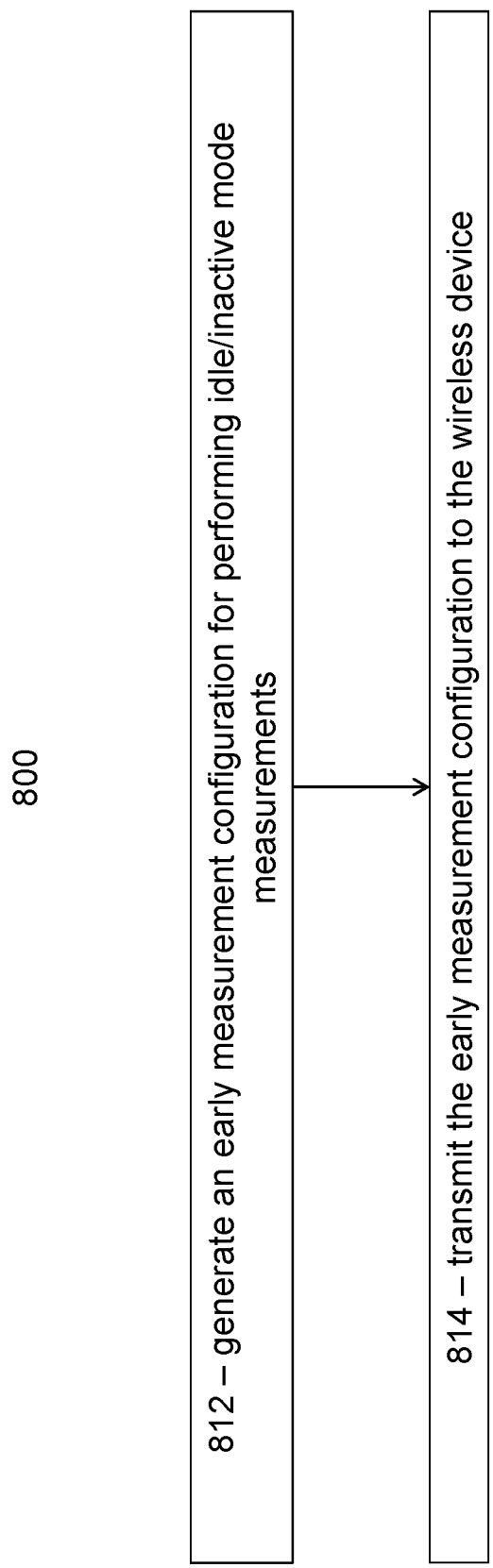
FIG. 8 is flowchart illustrating an example method in a network node, according to certain embodiments.

FIG. 8 is a flowchart illustrating an example method in a network node, according to certain embodiments. In particular embodiments, one or more steps of FIG. 8 may be performed by network node 160 described with respect to FIG. 5.

The method may begin at step 812, where the network node (e.g., network node 160) generates an early measurement configuration for performing idle/inactive mode measurements. The early measurement configuration comprises a measurement carrier list and a validity area list as described above with respect to FIG. 7.

At step 814, the network node transmits the early measurement configuration to a wireless device. The wireless device may use the early measurement configuration as described above with respect to FIG. 7.

Modifications, additions, or omissions may be made to method 800 of FIG. 8. Additionally, one or more steps in the method of FIG. 8 may be performed in parallel or in any suitable order.

Figure 9:
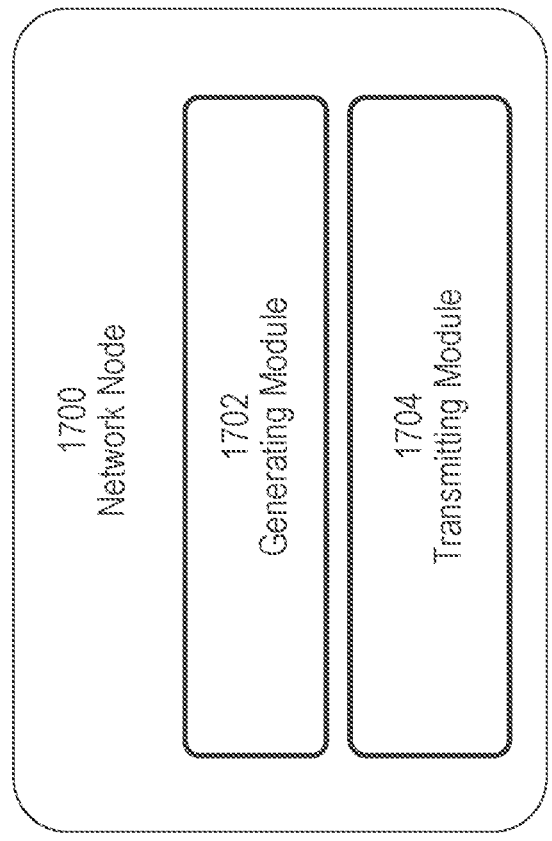
FIG. 9 illustrates a schematic block diagram of a wireless device and a network node in a wireless network, according to certain embodiments.
Figure 9:
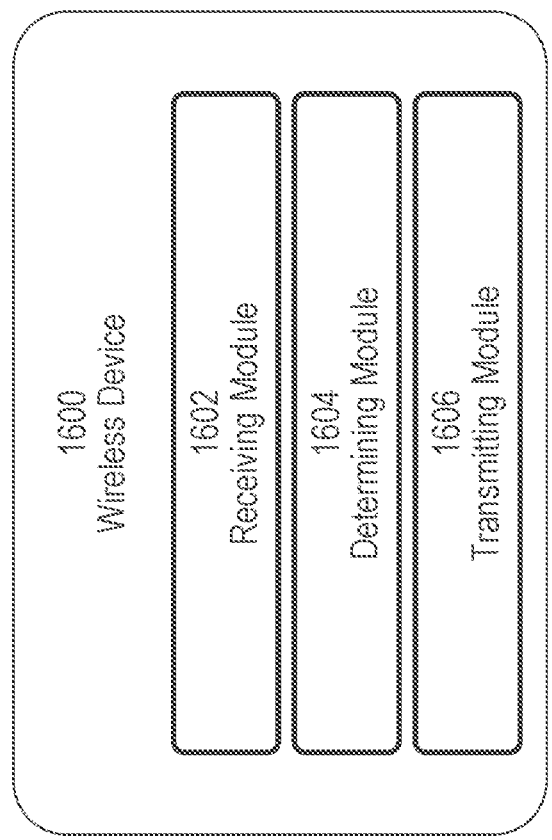

FIG. 9 illustrates a schematic block diagram of two apparatuses in a wireless network (for example, the wireless network illustrated in FIG. 5). The apparatuses include a wireless device and a network node (e.g., wireless device 110 and network node 160 illustrated in FIG. 5). Apparatuses 1600 and 1700 are operable to carry out the example methods described with reference to FIGS. 7 and 8, respectively, and possibly any other processes or methods disclosed herein. It is also to be understood that the methods of FIGS. 7 and 8 are not necessarily carried out solely by apparatuses 1600 and/or 1700. At least some operations of the methods can be performed by one or more other entities.

Virtual apparatuses 1600 and 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause receiving module 1602, determining module 1604, transmitting module 1606, and any other suitable units of apparatus 1600 to perform corresponding functions according one or more embodiments of the present disclosure. Similarly, the processing circuitry described above may be used to cause generating module 1702, transmitting module 1704, and any other suitable units of apparatus 1700 to perform corresponding functions according one or more embodiments of the present disclosure.

As illustrated in FIG. 9, apparatus 1600 includes receiving module 1602 configured to receive early measurement configuration according to any of the embodiments and examples described herein. Determining module 1604 is configured to determine whether to perform idle/inactive mode measurements according to any of the embodiments and examples described herein. Transmitting module 1606 is configured to transmit measurement results, according to any of the embodiments and examples described herein.

As illustrated in FIG. 9, apparatus 1700 includes generating module 1702 configured to generate an early measurement configuration according to any of the embodiments and examples described herein. Transmitting module 1704 is configured to transmit the early measurement configuration to a wireless device according to any of the embodiments and examples described herein.

Figure 10:
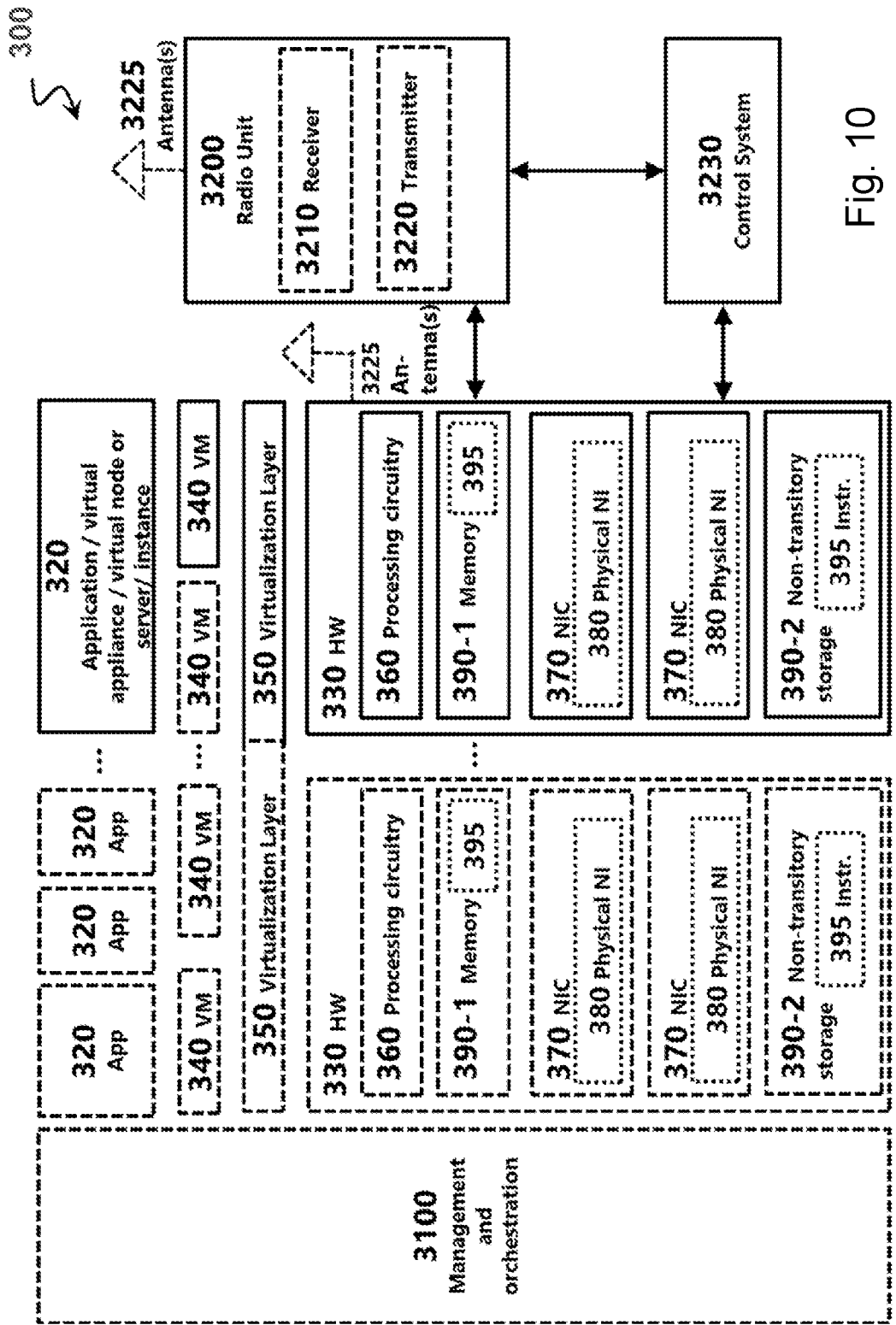
FIG. 10 illustrates an example virtualization environment, according to certain embodiments.

FIG. 10 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 10, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 18.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Figure 11:
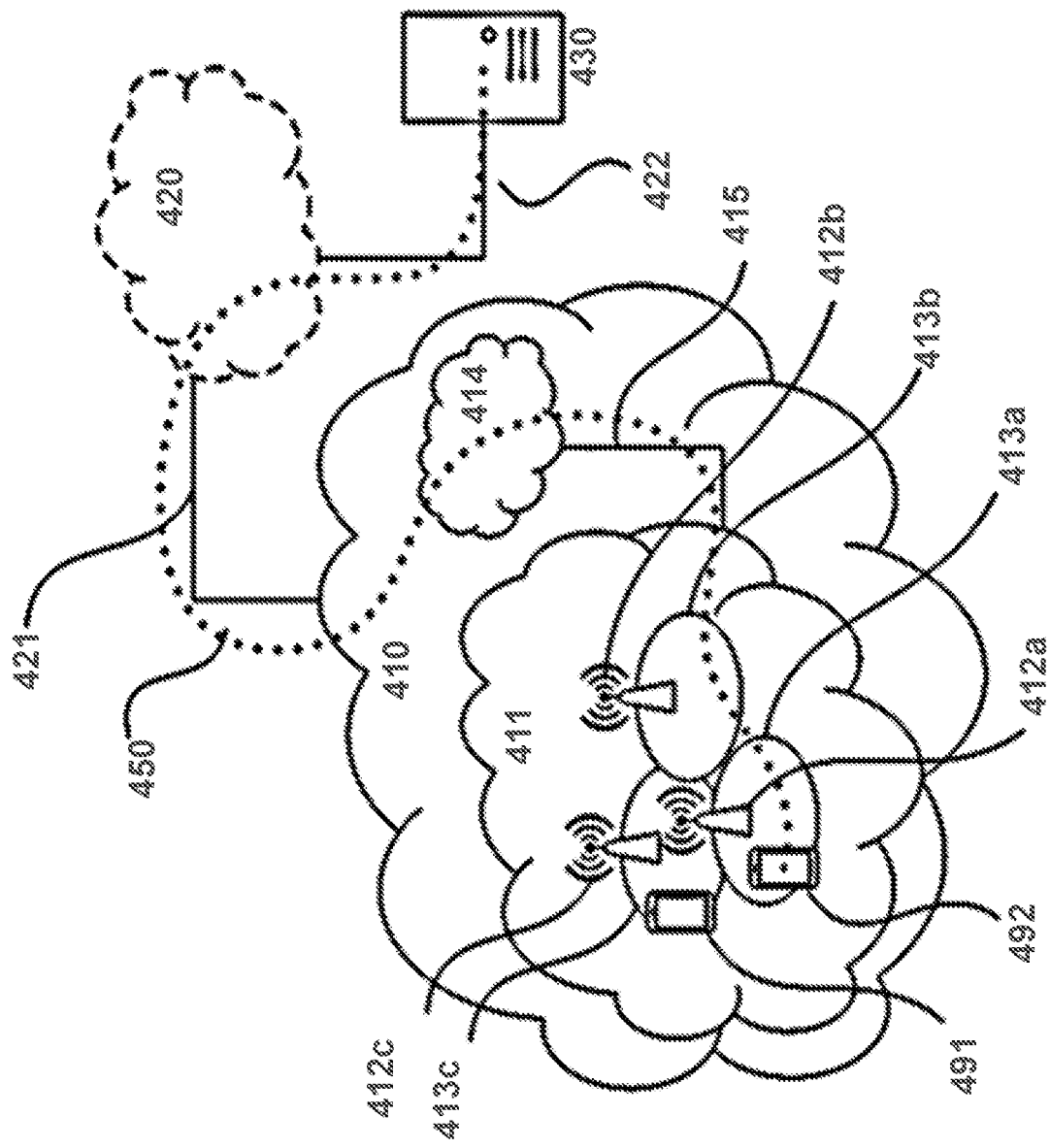
FIG. 11 illustrates an example telecommunication network connected via an intermediate network to a host computer, according to certain embodiments.

With reference to FIG. 11, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 11 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 12:
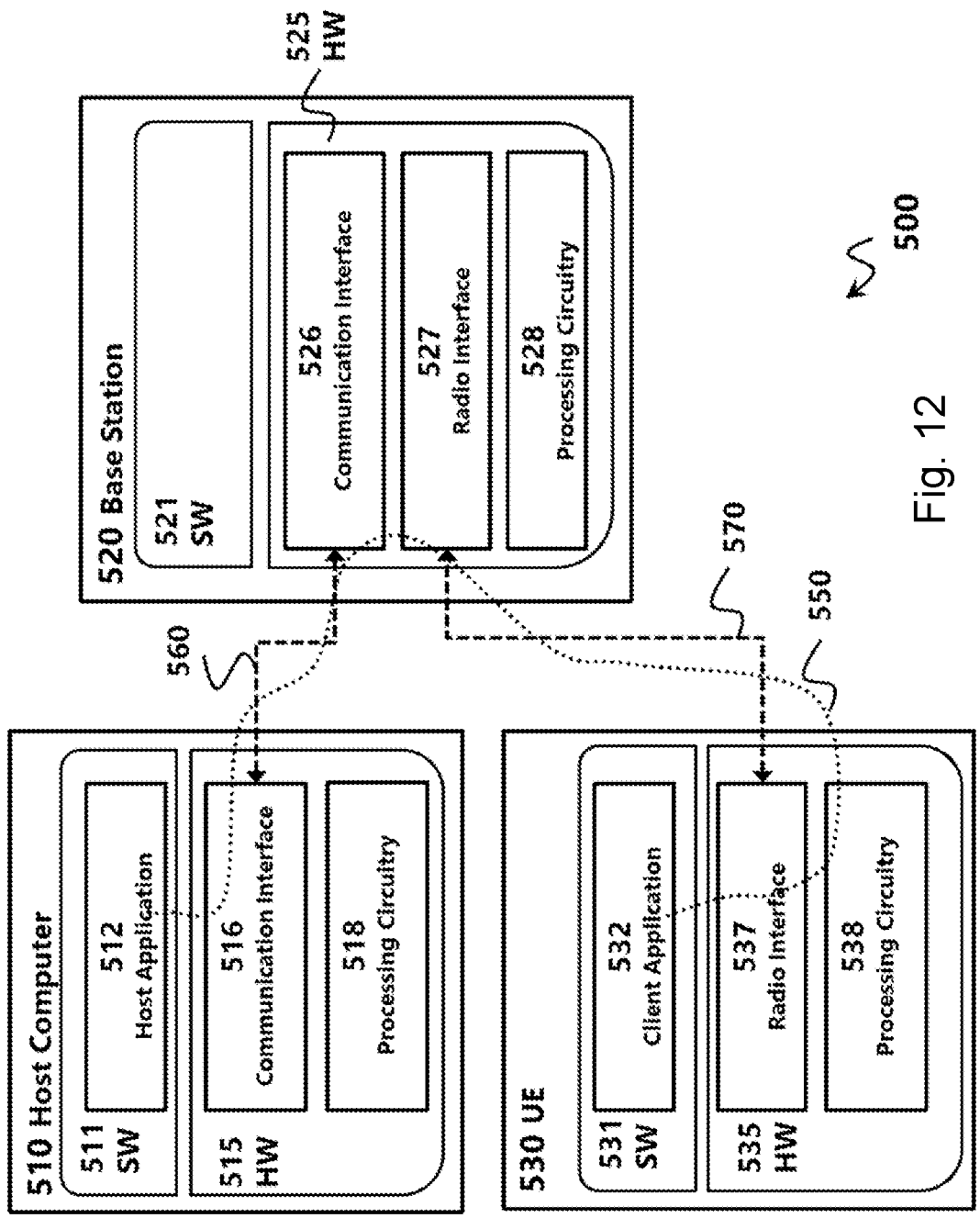
FIG. 12 illustrates an example host computer communicating via a base station with a user equipment over a partially wireless connection, according to certain embodiments.

FIG. 12 illustrates an example host computer communicating via a base station with a user equipment over a partially wireless connection, according to certain embodiments. Example implementations, in accordance with an embodiment of the UE, base station and host computer discussed in the preceding paragraphs will now be described with reference to FIG. 12. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 12) served by base station 520. Communication interface 526 may be configured to facilitate connection 560 to host computer 510. Connection 560 may be direct, or it may pass through a core network (not shown in FIG. 12) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 12 may be similar or identical to host computer 430, one of base stations 412a, 412b, 412c and one of UEs 491, 492 of FIG. 10, respectively. This is to say, the inner workings of these entities may be as shown in FIG. 12 and independently, the surrounding network topology may be that of FIG. 10.

In FIG. 12, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., based on load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, which may provide faster internet access for users.

A measurement procedure may be provided for monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 13:
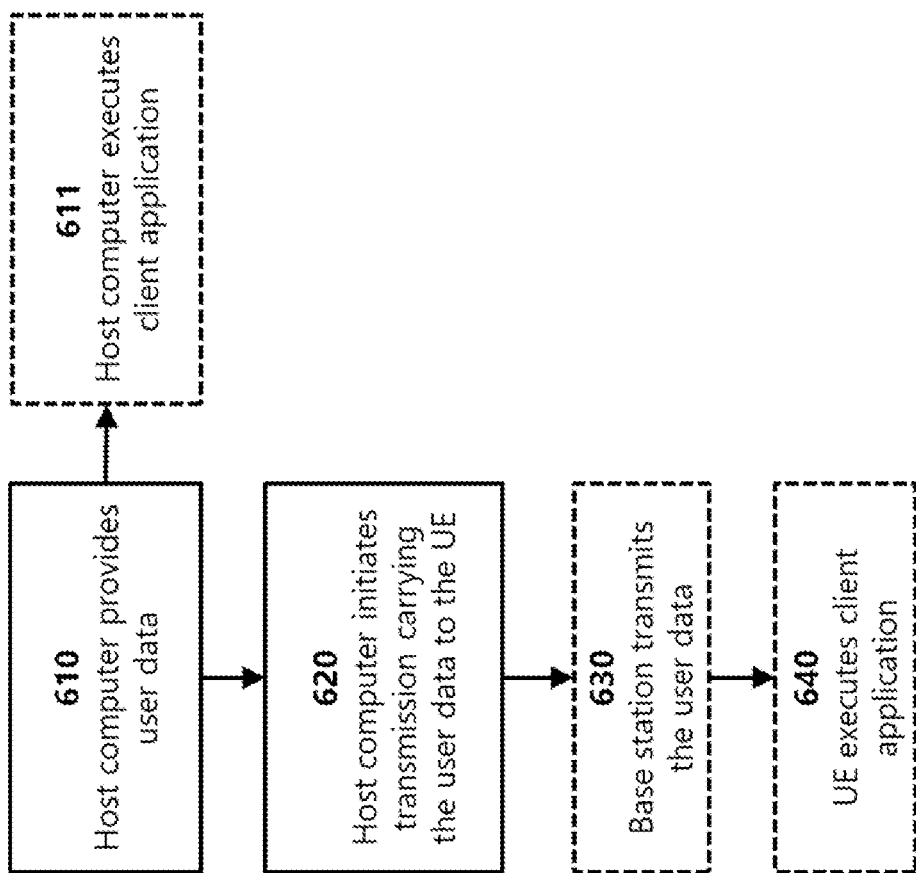
FIG. 13 is a flowchart illustrating a method implemented, according to certain embodiments.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section.

In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 14:
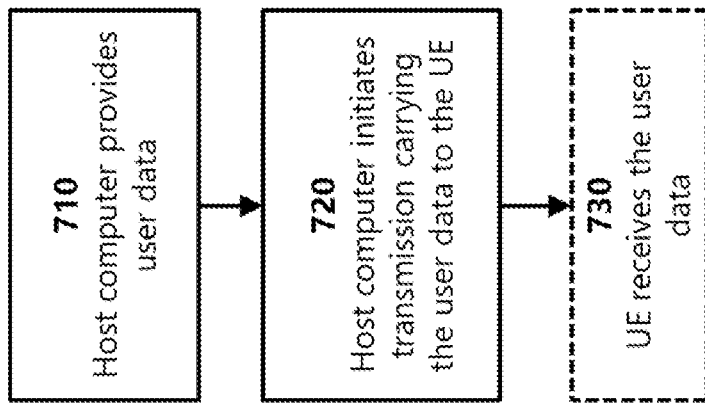
FIG. 14 is a flowchart illustrating a method implemented in a communication system, according to certain embodiments.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section.

In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 15:
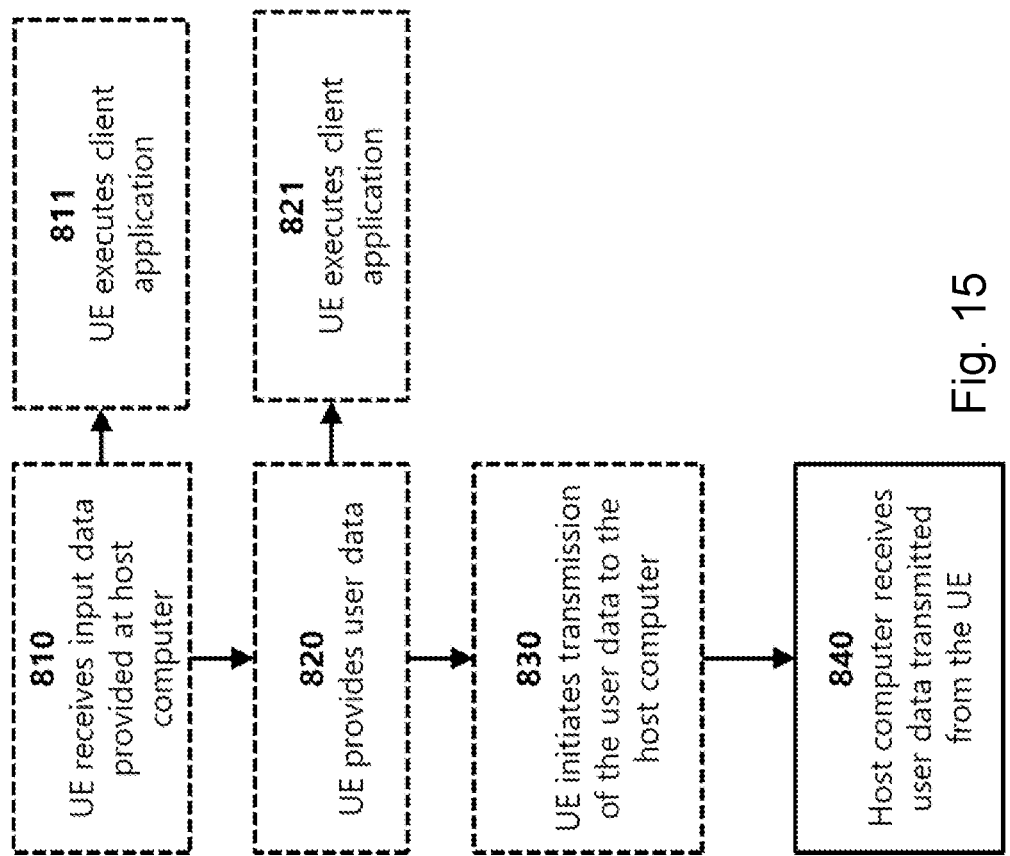
FIG. 15 is a flowchart illustrating a method implemented in a communication system, according to certain embodiments.

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section.

In step 810 (which may be optional), the UE receives input data provided by the host computer. Additionally, or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 16:
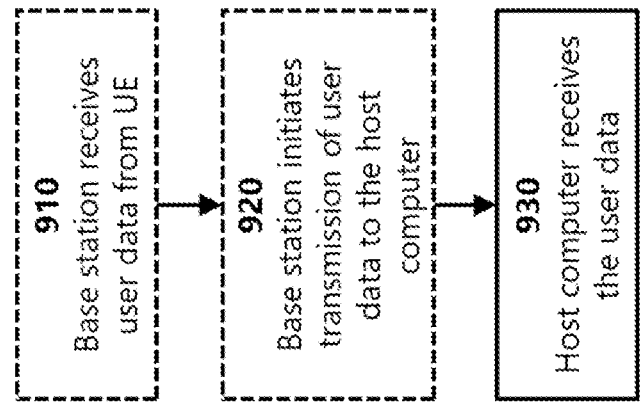
FIG. 16 is a flowchart illustrating a method implemented in a communication system, according to certain embodiments.

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section.

In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

At least some of the following abbreviations may be used in this disclosure. If there is an inconsistency between abbreviations, preference should be given to how it is used above. If listed multiple times below, the first listing should be preferred over any subsequent listing(s).

3GPP 3rd Generation Partnership Project
5G 5th Generation
ABS Almost Blank Subframe
ACK/NACK Acknowledgment/Non-acknowledgment
ARQ Automatic Repeat Request
CA Carrier Aggregation
CC Carrier Component
CDMA Code Division Multiplexing Access
CG Configured Grant
CIR Channel Impulse Response
CP Cyclic Prefix
C-RNTI Cell RNTI
DL Downlink
DM Demodulation
E-SMLC Evolved-Serving Mobile Location Centre
eNB E-UTRAN NodeB
E-SMLC evolved Serving Mobile Location Center
E-UTRA Evolved UTRA
E-UTRAN Evolved UTRAN
gNB Base station in NR
GSM Global System for Mobile communication
HO Handover
LOS Line of Sight
LTE Long-Term Evolution
MAC Medium Access Control
MDT Minimization of Drive Tests
MME Mobility Management Entity
MSC Mobile Switching Center
NR New Radio
OSS Operations Support System O&M Operation and Maintenance
PCell Primary Cell
RAN Radio Access Network
RAT Radio Access Technology
RNC Radio Network Controller
RNTI Radio Network Temporary Identifier
RRC Radio Resource Control
RRM Radio Resource Management
RS Reference Signal
RSRP Reference Symbol Received Power OR Reference Signal Received Power
RSRQ Reference Signal Received Quality OR Reference Symbol Received Quality
SCH Synchronization Channel
SCell Secondary Cell
SDU Service Data Unit
SFN System Frame Number
SI System Information
SIB System Information Block
SON Self Optimized Network
SUL Supplemental Uplink
SS Synchronization Signal
TO Transmission Occasion
TOA Time of Arrival
TTI Transmission Time Interval
UE User Equipment
UL Uplink
UMTS Universal Mobile Telecommunication System
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device for performing early measurement, the method comprising:
   receiving an early measurement configuration for performing idle/inactive mode measurements, the early measurement configuration comprising:
   a measurement carrier list, each entry of the measurement carrier list comprising a carrier frequency and one or more cell identifiers associated with the carrier frequency for which the wireless device is to perform idle/inactive mode measurements;
   a validity area list, separate from the measurement carrier list, each entry of the validity area list comprising a carrier frequency and zero or more cell identifiers associated with the carrier frequency for which the wireless device is supposed to perform idle/inactive mode measurements;
   reselecting to a new cell;
   determining whether the wireless device may perform idle/inactive mode measurements while camping on the new cell based on the validity area list; and
   upon determining the wireless device may perform idle/inactive mode measurements while camping on the new cell, performing the idle/inactive mode measurements.

2. The method of claim 1, wherein determining the wireless device may perform idle/inactive mode measurements while camping on the new cell comprises determining that a carrier frequency of the new cell matches a carrier frequency in the validity area list.

3. The method of claim 2, wherein when an entry in the validity area list includes a carrier frequency and zero associated cell identifiers, then the entry is valid for any cell that uses the carrier frequency.

4. The method of claim 2, wherein determining the wireless device may perform idle/inactive mode measurements while camping on the new cell comprises further determining that a carrier frequency and a cell identifier of the new cell matches a carrier frequency and an associated cell identifier in the validity area list.

5. The method of claim 1, wherein the carrier frequencies in the validity area list differ by at least one carrier frequency from the carrier frequencies in the measurement carrier list.

6. The method of claim 1, further comprising upon determining the wireless device may not perform idle/inactive mode measurements while camping on the new cell, stopping a measurement timer and stopping idle/inactive mode measurements.

7. A wireless device capable of performing early measurement, the wireless device comprising processing circuitry operable to:
   receive an early measurement configuration for performing idle/inactive mode measurements, the early measurement configuration comprising:
   a measurement carrier list, each entry of the measurement carrier list comprising a carrier frequency and one or more cell identifiers associated with the carrier frequency for which the wireless device is to perform idle/inactive mode measurements;
   a validity area list, separate from the measurement carrier list, each entry of the validity area list comprising a carrier frequency and zero or more cell identifiers associated with the carrier frequency for which the wireless device is supposed to perform idle/inactive mode measurements;
   reselect to a new cell;
   determine whether the wireless device may perform idle/inactive mode measurements while camping on the new cell based on the validity area list; and
   upon determining the wireless device may perform idle/inactive mode measurements while camping on the new cell, perform the idle/inactive mode measurements.

8. The wireless device of claim 7, wherein the processing circuitry is operable to determine the wireless device may perform idle/inactive mode measurements while camping on the new cell by determining that a carrier frequency of the new cell matches a carrier frequency in the validity area list.

9. The wireless device of claim 8, wherein when an entry in the validity area list includes a carrier frequency and zero associated cell identifiers, then the entry is valid for any cell that uses the carrier frequency.

10. The wireless device of claim 8, wherein the processing circuitry is operable to determine the wireless device may perform idle/inactive mode measurements while camping on the new cell by further determining that a carrier frequency and a cell identifier of the new cell matches a carrier frequency and an associated cell identifier in the validity area list.

11. The wireless device of claim 7, wherein the carrier frequencies in the validity area list differ by at least one carrier frequency from the carrier frequencies in the measurement carrier list.

12. The wireless device of claim 7, the processing circuitry further operable to upon determining the wireless device may not perform idle/inactive mode measurements while camping on the new cell, stop a measurement timer and stop idle/inactive mode measurements.

13. A method performed by a network node for configuring early measurements for a wireless device, the method comprising:

generating an early measurement configuration for performing idle/inactive mode measurements, the early measurement configuration comprising:
a measurement carrier list, each entry of the measurement carrier list comprising a carrier frequency and one or more cell identifiers associated with the carrier frequency for which the wireless device is to perform idle/inactive mode measurements;
a validity area list, separate from the measurement carrier list, each entry of the validity area list comprising a carrier frequency and zero or more cell identifiers associated with the carrier frequency for which the wireless device is supposed to perform idle/inactive mode measurements; and
transmitting the early measurement configuration to the wireless device.

14. The method of claim 13, wherein the validity area list indicates that the wireless device may perform idle/inactive mode measurements while camping on a new cell when a carrier frequency of the new cell matches a carrier frequency in the validity area list.

15. The method of claim 14, wherein when an entry in the validity area list includes a carrier frequency and zero associated cell identifiers, then the entry is valid for any cell that uses the carrier frequency.

16. The method of claim 14, wherein the validity area list indicates that the wireless device may perform idle/inactive mode measurements while camping on a new cell when a carrier frequency and a cell identifier of the new cell matches a carrier frequency and an associated cell identifier in the validity area list.

17. The method of claim 13, wherein the carrier frequencies in the validity area list differ by at least one carrier frequency from the carrier frequencies in the measurement carrier list.

18. A network node capable of configuring early measurement for a wireless device, the network node comprising processing circuitry operable to:

generate an early measurement configuration for performing idle/inactive mode measurements, the early measurement configuration comprising:
a measurement carrier list, each entry of the measurement carrier list comprising a carrier frequency and one or more cell identifiers associated with the carrier frequency for which the wireless device is to perform idle/inactive mode measurements;
a validity area list, separate from the measurement carrier list, each entry of the validity area list comprising a carrier frequency and zero or more cell identifiers associated with the carrier frequency for which the wireless device is supposed to perform idle/inactive mode measurements; and
transmit the early measurement configuration to the wireless device.

19. The network node of claim 18, wherein the validity area list indicates that the wireless device may perform idle/inactive mode measurements while camping on a new cell when a carrier frequency of the new cell matches a carrier frequency in the validity area list.

20. The network node of claim 19, wherein when an entry in the validity area list includes a carrier frequency and zero associated cell identifiers, then the entry is valid for any cell that uses the carrier frequency.

21. The network node of claim 19, wherein the validity area list indicates that the wireless device may perform idle/inactive mode measurements while camping on a new cell when a carrier frequency and a cell identifier of the new cell matches a carrier frequency and an associated cell identifier in the validity area list.

22. The network node of claim 18, wherein the carrier frequencies in the validity area list differ by at least one carrier frequency from the carrier frequencies in the measurement carrier list.

* * * * *

UNITED STATES PATENT AND TRADEMARK OFFICE
CERTIFICATE OF CORRECTION

PATENT NO. : 12,156,067 B2
APPLICATION NO. : 17/775074
DATED : November 26, 2024
INVENTOR(S) : Rugeland et al.

It is certified that error appears in the above-identified patent and that said Letters Patent is hereby corrected as shown below:

In the Specification

In Column 2, Line 48, delete "9 DC)" and insert -- 9DC --, therefor.

In Columns 3 & 4, in Table, Line 15, delete "dl-CarrierFrew-v1090" and insert -- dl-CarrierFreq-v1090 --, therefor.

In Column 4, Lines 33-34, delete "includess CellToAddModListExt-v1370" and insert -- includes sCellToAddModListExt-v1370 --, therefor.

In Columns 5 & 6, in Table-continued, Line 7, delete "activated;" and insert -- activated: --, therefor.

In Columns 5 & 6, in Table-continued, Line 9, delete "dormant" and insert -- dormant: --, therefor.

In Columns 5 & 6, in Table-continued, Line 13, delete "VarMeasConfig;" and insert -- VarMeasConfig: --, therefor.

In Columns 5 & 6, in Table-continued, Line 16, delete "measId;" and insert -- measId: --, therefor.

In Column 5, Line 43, delete "(SIBS)" and insert -- (SIB5) --, therefor.

In Column 5, Line 49, delete "SIBS." and insert -- SIB5. --, therefor.

In Column 6, Line 32, delete "{epc,fivegc}" and insert -- {epc, fivegc} --, therefor.

In Column 6, Line 36, delete "ASN1STOP" and insert -- ASN1STOP --, therefor.

In Column 6, Line 48, delete "- Need OR" and insert the same at Line 47, after "-", as a continuation sub-point.

Signed and Sealed this
Twelfth Day of August, 2025

Coke Morgan Stewart
*Acting Director of the United States Patent and Trademark Office*

Page 1 of 2

CERTIFICATE OF CORRECTION (continued)
U.S. Pat. No. 12,156,067 B2

In Column 7, Line 7, delete "ASNISTOP" and insert -- ASN1STOP --, therefor.

In Column 7, Line 27, delete "measIdleDurationl" and insert -- measIdleDuration --, therefor.

In Column 8, Line 35, delete "SIBS" and insert -- SIB5 --, therefor.

In Columns 7 & 8, in Table, Line 15, delete "SystemInformationBlockTyped" and insert -- SystemInformationBlockType3 --, therefor.

In Columns 9 & 10, in Table, Line 20, delete "3>forNB-IoT:" and insert -- 3>for NB-IoT: --, therefor.

In Columns 9 & 10, in Table, Line 22, delete "SystemInformationBlockType2-NB;" and insert -- SystemInformationBlockType2-NB: --, therefor.

In Columns 11 & 12, in Table, Line 11, delete "2>forNB-IoT:" and insert -- 2>for NB-IoT: --, therefor.

In Column 12, Line 14, delete ". ..." and insert -- ... --, therefor.

In Column 12, Line 18, delete "Message" and insert -- message --, therefor.

In Column 12, Line 22, delete "ASNISTART" and insert -- ASN1START --, therefor.

In Columns 13 & 14, in Table-continued, Line 33, delete "1>ifT331" and insert -- 1>if T331 --, therefor.

In Column 15, Line 8, delete "- Need OR" and insert the same at Line 7, after "-", as a continuation sub-point.

In Column 15, Line 23, delete "OPTIONAL," and insert -- OPTIONAL --, therefor.

In Column 15, Line 30, delete "ASNISTOP" and insert -- ASN1STOP --, therefor.

In Column 15, Line 38, delete "di-Bandwidth" and insert -- dl-Bandwidth --, therefor.

In Column 31, Lines 43-44, delete "U IRAN," and insert -- UTRAN, --, therefor.